United States Patent [19]
Zeytoonjian et al.

[11] Patent Number: 5,719,555
[45] Date of Patent: *Feb. 17, 1998

[54] GOLF CART CONTROL AND MONITORING APPARATUS AND SYSTEM USING DIGITAL SIGNAL MODULATION TECHNIQUES

[75] Inventors: Douglas Zeytoonjian, Boston, Mass.; Frederick Zeytoonjian, Sr., Somers, Conn.; Harold Kramer, Pittsfield, Mass.; Chris M. Harrises, Nashua; Roland Harris, Hudson, both of N.H.

[73] Assignee: Cart Watch, Inc., Enfield, Conn.

[*] Notice: The term of this patent shall not extend beyond the expiration date of Pat. No. 5,610,586.

[21] Appl. No.: 497,693

[22] Filed: Jun. 30, 1995

Related U.S. Application Data

[63] Continuation-in-part of Ser. No. 391,416, Feb. 16, 1995, Pat. No. 5,610,586, which is a continuation-in-part of Ser. No. 82,030, Jun. 24, 1993, Pat. No. 5,438,319.

[51] Int. Cl.$^6$ .................................................. G08B 13/14
[52] U.S. Cl. .................... 340/571; 340/332; 340/691; 340/988
[58] Field of Search ........................ 430/571, 573, 430/691, 988, 993, 323 R, 326, 332, 309.15, 328, 329, 384.7; 377/5, 9, 17; 455/67.7, 55.1; 307/64, 66; 343/719; 280/33.994, DIG. 5

[56] References Cited

U.S. PATENT DOCUMENTS

| | | |
|---|---|---|
| 3,934,175 | 1/1976 | Clark .................................. 361/56 |
| 4,480,310 | 10/1984 | Alvarez ........................... 340/988 X |
| 4,656,476 | 4/1987 | Tavtigian ............................ 340/993 |
| 4,703,444 | 10/1987 | Storms, Jr. et al. .................. 364/561 |
| 4,766,847 | 8/1988 | Venczel et al. .................. 340/573 X |
| 4,792,804 | 12/1988 | Rubechini ........................... 342/27 |
| 4,926,161 | 5/1990 | Cupp .................................. 340/572 |
| 4,996,945 | 3/1991 | Dix, Jr. ............................... 119/721 |
| 5,044,634 | 9/1991 | Dudley ......................... 340/323 R X |
| 5,053,768 | 10/1991 | Dix, Jr. ............................... 340/988 |
| 5,097,416 | 3/1992 | Matthews ..................... 340/323 R X |
| 5,305,201 | 4/1994 | Matthews ..................... 340/323 R X |
| 5,326,095 | 7/1994 | Dudley ......................... 340/323 R X |
| 5,438,319 | 8/1995 | Zeytoonjian et al. ............... 340/571 |
| 5,610,586 | 3/1997 | Zeytoonjian et al. ............... 340/573 |

*Primary Examiner*—Thomas Mullen
*Attorney, Agent, or Firm*—Lorusso & Loud

[57] ABSTRACT

A golf cart control and monitoring system, includes a signal transmitter, at least one antenna, a receiving and processing apparatus, and an event log device. The signal transmitter transmits a plurality of electromagnetic digitally modulated signals. The receiving and processing apparatus receives the electromagnetic signals radiating from each antenna and processes the signals to determine the position of the cart with respect to each antenna and correspondingly with respect to the prespecified feature. A control signal is outputted therefrom representative of the location of the cart. The event log device is responsive to the control signals and generates historical log of how long and how many times the golf cart is located within course restricted areas. In another embodiment, digital signals are radiated from antennas proximate designated start areas, designated stop areas and designated intermediate cart travel positions to track time of play and to provide displays of same to a cart operator. The receiving and processing apparatus includes a memory to store the event device historical log and playtime information for later retrieval by course representatives.

113 Claims, 18 Drawing Sheets

GOLF CART CONTROL AND MONITORING APPARATUS AND SYSTEM USING DIGITAL SIGNAL MODULATION TECHNIQUES

This application is a continuation in part of application Ser. No. 08/391,416, filed Feb. 16, 1995, now U.S. Pat. No. 5,610,586, which is a continuation in part of application Ser. No. 08/082,030, filed Jun. 24, 1993, now U.S. Pat. No. 5,438,319, the teachings of which are incorporated herein by reference.

FIELD OF INVENTION

This invention relates to a system/apparatus for controlling and monitoring the play of golf, particularly to a system/apparatus that monitors the movement of a golf cart with respect to pre-specified areas of a golf course such as restricted or protected areas, and more particularly a system/apparatus which provides an event history of the golf cart's movement with respect to at least a portion of such areas, and which provides visual and/or auditory alerts and alarms so a golf cart operator can avoid such areas.

BACKGROUND OF THE INVENTION

Maintenance and management of golf courses involves a significant amount of time and expense. This time and cost for maintenance is impacted when golf carts are driven onto areas of the golf course (e.g. the greens) where the traveling golf carts can cause damage. In addition to the cost and time associated with fixing the damaged grounds, the damage areas can inconvenience golfers, affect play, and in general make a golfer's use of the course less enjoyable.

One method available for controlling the movement of golf carts, while they are being operated on golf courses, to protect restricted areas involves providing some sort of warning to identify restricted areas of the golf course so the golf cart operator will avoid them. In a second method a predetermined course of action is dictated to the cart operator in the event the operator does not heed the warnings identifying restricted areas and more particularly means are provided to prevent the cart from being driven further into the restricted area.

Under the first method golf courses have provided signs to identify restricted areas and to identify the paths on which the golf carts are supposed to travel. Alternatively, visual and auditory alarms have been provided on the golf carts to identify restricted areas and to indicate when the carts have intruded into the restricted area. Unfortunately, these schemes are not as effective as one would like.

The alternate scheme, disclosed in U.S. Pat. No. 4,656,476, uses an antenna/transmitter combination to identify the boundaries of the restricted areas; uses a receiver and signal processor to receive the transmitted signals and generate an output signal when the signal strength has exceeded a threshold; and provides visual/auditory alarms, responsive to the output signals, for the operators to determine where to drive the golf carts. Three visual alarms are used to indicate that the golf cart is approaching the outer boundary of a restricted area, to indicate that the cart is approaching a restricted area, and to indicate that the cart has entered a restricted area. An auditory alarm can be used to supplement the visual warnings.

This scheme, however, is only effective to protect restricted areas if the operator is willing to follow the visual and auditory queues. There is no provision made to hold operators accountable for their actions or lack thereof. Nor is there any provision made so golf course rangers patrolling the course can identify golf carts which are improperly parked or traveling on the golf course.

The second cart control method assumes that some operators will not respond, for one reason or another, to the visual and/or auditory alarms. As such, this method dictates a predetermined course of action to be taken by a cart operator in the event the operator does not exit or avoid restricted areas per the warnings. The apparatus includes provisions to ensure that the operator follows the predetermined course of action.

The golf cart control system, disclosed in U.S. Pat. No. 5,053,768, provides both alarms to induce operator action and means for enforcing a predetermined course of action if the golf cart is not removed from a restricted area within a predetermined period of time. This system identifies the boundary of the restricted area by means of an single antenna and transmitter. When a signal above a predetermined threshold is received, the cart control system receiver package located on the golf cart, provides a visual warning (e.g., a single colored light) that the cart is entering a restricted area. This signal also starts a timer used to generate a second visual alarm if the golf cart has not exited the restricted area within a preset time.

If the operator fails to exit the restricted area within the preset time, the system has provisions for disabling the golf cart so it cannot be driven further in the forward direction in the protected area. Rather the golf cart is disabled so that it can only be driven in reverse or "backed out" of a restricted area. Disablement is accomplished by interconnecting the golf cart's drive with the cart control system. Disabling of the cart along with pre-specifying the cart's direction of travel has certain short comings.

Since golf courses are not known for being flat, especially around the greens, it is quite possible for the cart to be going down an inclined section when the power is cut off. If the operator is not paying attention or is unaware that they have entered a restricted area (e.g., the alarm light has burned out), it is possible for the operator to become unnecessarily surprised or even injured (e.g., bump head) when the power is cut off and the vehicle comes to a sudden stop. Also, when the cart is being backed out, the cart's operation could damage the turf or grass on the inclined section if it is wet.

This system contains no features for identifying non-conforming operators to golf course representatives (e.g., course rangers) during or after a game (i.e., no means for holding operators accountable for their actions). Rather, as indicated above, after receipt of the initial signal the cart is disabled upon the expiration of a predetermined amount of time. Thus, there is no way of determining if a cart operator ever violated the course rules concerning restricted areas during the time of play.

If an operator is not familiar with the disabling function or does not believe a restricted area had been entered, the operator may incorrectly conclude that the cart has had a power or transmission failure. The delay in resolving the reason for the golf cart's failure can impact or delay the play of other golfers, as well as annoy the operator. The operator could also become annoyed because the cart has become disabled and the operator is being forced to back-up the golf cart. Since golf like many games is part mental attitude, a golfer is quite likely to blame a bad hole or bad game on the problems with the cart. While protecting restricted areas is important, annoying golfers or interfering with the game of other golfers is not necessarily in the best interests of the golf course.

As a practical matter, the predetermined time period is on the order of about 2 seconds to assure that a golf cart does not make a large incursion into a restricted area (i.e., a golf cart traveling at 10 mph will traverse about 30 feet or 10 yards in 2 seconds). Because of the restrictive turn radius of golf carts, it is quite likely that the predetermined time period will expire before the cart can be turned around to exit the area. Thus, operators who turn their cart around and are exiting in compliance with the first warning will be forced to back-up out of the restricted area. This would happen even if driving forward would be the fastest and best way to exit. The likelihood of the time expiring before exiting becomes greater for operators who are moving at speeds slower than that assumed for determining the preset time period.

Disabling the cart also involves interfacing and interconnecting the cart control system with the controls and drive system for the golf cart. This increases the complexity of the cart control system and creates another failure mode for the cart. Since it is a common practice for golf courses to rent their golf carts, it is quite possible that such modifications to disable a cart would not be allowed by the cart owner; could only be done by the cart owner at the golf course's expense; or could involve additional charges from the owner to return the cart back to its as rented condition (e.g., repair cart). These added costs will likely exceed the typical rental charges, especially for daily rentals. Alternatively, the golf course would have to purchase carts in lieu of renting them.

Rental carts are a concern because they are usually obtained when a golf course is anticipating a large number of guests for special events such as tournaments. Damage to restricted areas is more likely to occur at these times because the guests are not familiar with course rules and the areas of the course to be avoided. As such, rental cart usage and the potential for damage must be addressed.

The copending applications Ser. No. 08/082,030, and Ser. No. 08/391,416, filed Feb. 16, 1995, describe a number of cart control and monitoring system; one system uses at least one buried antenna to generate the signals identifying the boundary of the warning zone/restricted area, another system uses at least two buried antennas to generate the signals identifying the boundary of the warning zone/restricted area, and yet another system uses at least three above ground antennas that transmit ranging signals so a cart's position on the course can be determined, particularly the cart's position with respect to restricted areas. These systems require multiple transmitters/receivers, use of different transmission frequencies and the described buried antenna systems are also limited in the kind of information that can be developed for retrieval by course representatives.

Another course management concern that affects play and causes golfer inconvenience is when golfers take a longer amount of time to play a game of golf than expected. This is often referred to as slow play. Typically tee off or start times for golfers are staggered so the golfers that tee off earlier have sufficient time to advance their play so they should not interfere with the game of the later starting golfers. However, on crowded courses slow playing golfers typically delay the game of the later starting golfers or the slow playing golfers stop their play long enough so the later started golfers can play through. Playing through also creates the potential for physical damage to the course because the golf cart for the later started golfers would have to drive around the cart of an earlier started golfer (e.g., cart would have to leave designated cart path).

Present techniques for dealing with slow play, involves manual tracking of the playtime and/or providing a golfer with a mechanism that the golfer operates to keep track of the time of play. Both techniques require the active and continuous involvement of course representatives as well as the golfers. Alternatively, course management could increase the delay between the start times, however, this affects the number of golfers who can use the course and correspondingly the fees for golfing.

The copending application Ser. No. 08/391,416, filed Feb. 16, 1995, describe ways in which a system using a single buried antenna or a system using ranging signals from above ground antennas can be used to automatically keep track of the time of play. However, in these described systems integrating a sub-system or system that uses a buried antenna for tracking playtime with the control and monitoring system for protecting restricted areas that also uses buried antenna system involves additional transmitters and receivers and increases the complexity of the electronics package mounted on the golf cart.

Other systems involving golf cart control or locating a golf cart with respect to some feature of the golf course are disclosed in U.S. Pat. Nos. 4,480,310 and 4,926,161.

Therefore, it is an object of the present invention to provide a golf cart control and monitoring apparatus that monitors golf cart usage so cart operators who intrude into restricted/protected areas of a golf course can be identified and so these operators can be held accountable for their actions after and/or during a game.

It is a further object of the present invention to provide an apparatus that does not involve controlling the operation of a golf cart to prevent intrusion or further intrusion into a restricted area (e.g., disabling the cart).

Another object of the present invention is to provide an apparatus that makes decisions based on cart location with respect to the restricted area.

It is yet a further object of the present invention to provide an apparatus that provides both visual and auditory alarms/ signals to a golf cart operator to identify restricted areas so the operator will not intrude into these areas, as well as an apparatus that provides visual alarms so course personnel can readily identify golf carts that are in restricted areas.

It is yet another object of the present invention to provide a system/apparatus that uses digital signal generation techniques and digital signals so specific areas of a golf course can be identified.

It is still yet a further object of the present invention to provide a system/apparatus that automatically determines and keeps track of the play time for each game and to make this information available to the cart operator/golfer as well as course representatives.

It is still yet another object of the present invention to provide a system/apparatus that can be adapted and backfitted to existing buried wire antenna systems.

SUMMARY OF THE INVENTION

This invention features a golf cart control and monitoring system that monitors golf cart usage with respect to prespecified areas of a golf course. The prespecified course features include restricted areas, designated start areas, designated stop or end-of-play areas, and designated intermediate travel positions of a golf cart. The system provides visual and auditory alarms to cart operators advising of restricted areas so operators can avoid these areas as well as including provisions so cart operators who intrude into restricted/protected areas of a golf course can be identified and held accountable for their actions after and/or during a game. The instant invention can be practiced using a number of different antenna configurations; at least one antenna disposed proximate a prespecified course feature and preferably below grade and at least two antennas disposed proximate a prespecified course feature and preferably below grade.

The golf cart control and monitoring system of one embodiment includes a signal transmission means, a receiving and processing means, and an event log means. The signal transmission means transmits a plurality of digitally modulated electromagnetic signals. The signals are preferably digitally modulated using the pulse-group modulation or pulse-width modulation technique. However, it is within the scope of the present invention for the signals to be digitally modulated using any of a number of digital modulation techniques as is known in the art. Preferably, the signal transmission means includes at least one antenna proximate a prespecified feature and preferably below grade. The type of antenna and the disposition of the antenna relative to the prespecified feature is established based on the electromagnetic field needed to define the designated area (e.g., the restricted area about a green).

The transmission means preferably includes a microprocessor that determines when the digital signal is to be transmitted and what digital signal is to be transmitted. For multiple antenna configurations, the transmission means' power amplifiers are selectively powered so only the digital signal to be transmitted from a particular antenna is sent. This also conserves the power or energy of the transmission means.

The receiving and processing means receives and processes the digital signals radiating from the antennas and determines the position of the receiving and processing means, and correspondingly the golf cart, with respect to the prespecified feature. For example, it determines the position of the cart with respect to a specified restricted area. The receiving and processing means outputs control signals that are representative of the location of the cart. One control signal outputted is representative of the golf cart being located in the restricted area and another control signal outputted indicates that the cart is approaching a restricted area. Other control signals are outputted when the cart is determined to be in a designated start area, a designated stop area and a designated intermediate travel position.

The event log device is responsive to the receiving and processing means control signals and generates a log of how long and/or how many times the golf cart was located within golf course restricted areas. In alternate embodiments, the event log means includes an event counter that counts each time the cart is considered to have entered into the restricted area and a time accumulation means for determining the amount of time the cart is considered to be in the restricted area, as well as means for displaying the number of restricted area entries and the amount of time the cart was in restricted areas. In yet further embodiments, the event log information is retained for each restricted area along with information identifying the area intruded.

The receiving and processing means includes means for determining when the golf cart is approaching the restricted area (i.e., cart in a warning area) and when the cart is considered located in a restricted area. The signal receiving and processing means outputs a first control signal when the cart is determined to be in the warning area and a second control signal when the cart is considered to be located in the restricted area. More particularly, the signal transmission means generates a plurality of repetitive signal pulses and the signal receiving and processing means includes means for determining based on these signal pulses when the cart is in the warning area and when the cart is considered located in the restricted area. In particular, threshold strength values are established to define the boundary for the warning zone and the restricted area. Thus, when the threshold signal strength value that defines a particular boundary (e.g., boundary for a warning zone) is meet or exceeded, the first or second control signal is outputted.

Similarly, for other prespecified features, at least one threshold signal strength value is established to define the boundary for each prespecified feature. When the threshold signal strength value that defines the boundary for the prespecified feature is met or exceeded, the golf cart is considered to be within the designated area for the prespecified feature and control signals are outputted to implement the appropriate monitoring and/or warning action.

In other embodiments, the control and monitoring system includes an external visual warning means, visual alarm means, auditory alarm means, message display means, solar electrical power supply means and/or a lightning protection device that protects the signal transmission means from lightning strikes. The visual warning means generates a visual signal to course representatives identifying golf carts that are considered located in restricted areas. The visual and auditory alarms provide visual and auditory alarms or cues to the cart operator to indicate that the cart is approaching a restricted area or that the cart is considered in the restricted area. These alarms are also used to draw the operator's attention to pre-scripted messages being displayed. The message display means displays at least one pre-scripted message to inform the cart operator of the cart's location with respect to restricted areas. In particular, a message is displayed that the cart is approaching the restricted area or that the cart is in a restricted area.

Preferably, the processing and control means includes a processing means for processing each received digital signal to determine the location of the cart and a memory for storing data and information. The data and information stored therein includes, programming information, data and information used by the processing means (e.g., prespecified signal strength threshold values) and data accumulated during cart usage (e.g., accumulated event time, playtime).

DESCRIPTION OF THE PREFERRED EMBODIMENT

The instant invention is most clearly understood with reference to the following definitions:

Prespecified golf course features shall be understood to mean those areas on the golf course designated by course management as being areas where the course wants to monitor and control the operation of golf carts as well as monitoring and controlling time of play. Specifically, prespecified areas include restricted areas of the golf course where operation of a golf cart is normally not permitted, warning areas proximate restricted areas; areas designated as being the starting point for play, areas designated as being the ending point for play, and areas designated as intermediate positions for play or intermediate travel positions of the golf cart.

Digital signals shall be understood to mean electromagnetic signals which are modulated using any of a number of digital signal modulation techniques such as pulse-width modulation, pulse-amplitude modulation, pulse-position modulation, pulse-group modulation, amplitude shift keying, frequency shift keying, phase shift keying or any combination of these techniques.

Pulse-width modulated digital signals shall be understood to mean electromagnetic signal pulses whose widths are controlled to define a specific amplitude or to represent a specific parameter. In the instant invention, the pulse width is controlled to identify or distinguish the type of signal source. So the width of the signal is representative of the signal source (e.g., signal from the antenna for a designated start area).

A pulse-group modulated signal shall be understood to mean an electromagnetic signal that consists of a group of signal pulses where the signal has a predefined structure of pulse positions. The presence or lack thereof of a pulse at each defined pulse position defines a bit of information (e.g., a signal pulse equates to a binary one and no signal pulse equates to a binary zero). The grouping of pulse and no pulses defines the binary signal. In this way, information is provided that both identifies the prespecified feature as well as distinguishes the signal source (e.g., the signal is from the antenna for the restricted area at the green for the first hole).

Figure 1:
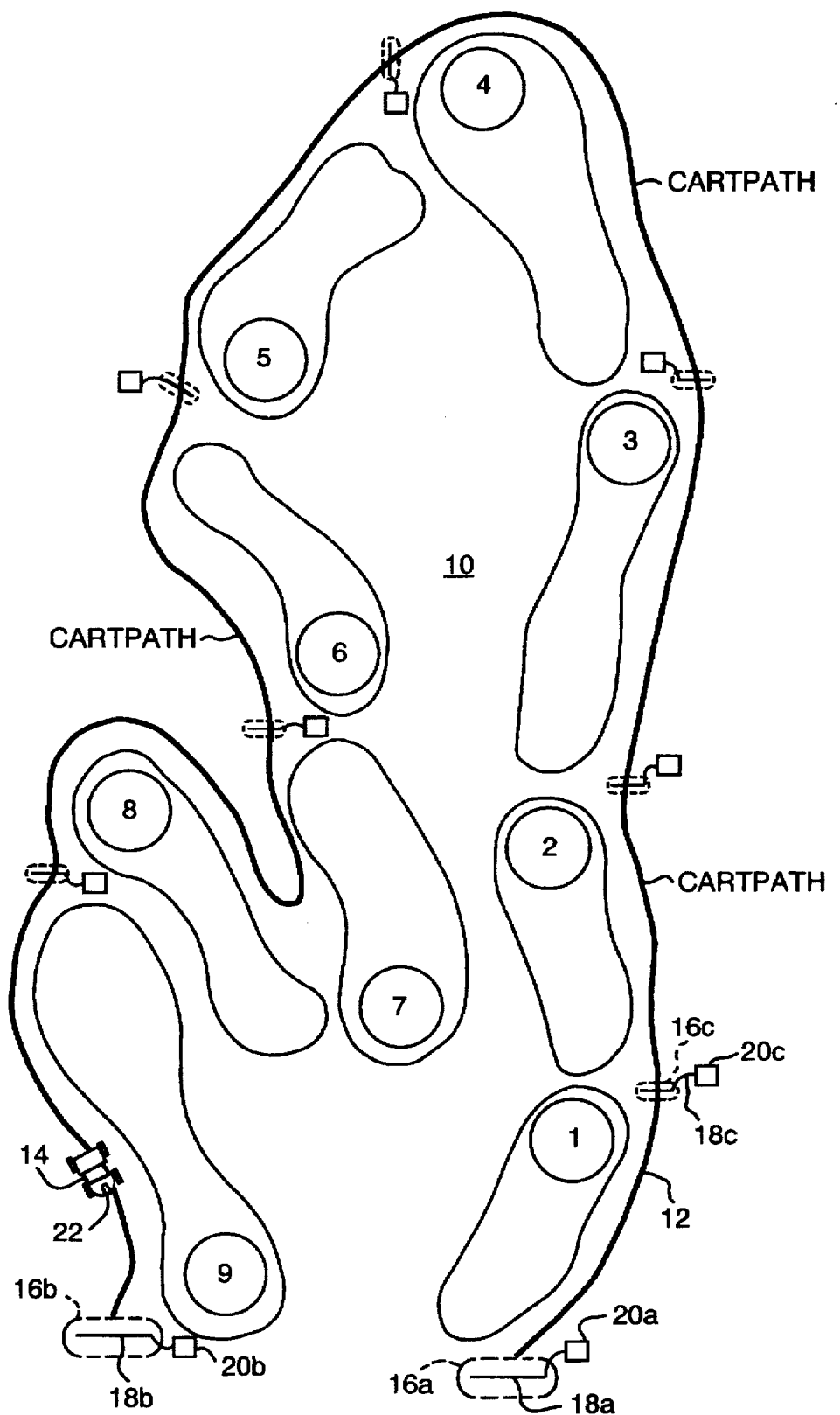
FIG. 1 is a plan view of the front nine holes for a golf course.

Golf courses are designed to challenge golfers, to utilize the available space and to maintain a pleasing environment. There is shown in FIG. 1, the front nine holes 10 of a golf course. Disposed about the front nine holes 10 is a cart path 12 in which the golf carts 14 are to travel. Providing a designated path 12 for travel of golf carts 14 is one means golf course management uses to protect areas from physical damage. Not shown on FIG. 1 are the stands of trees, brooks, streams and other typical topological features of golf courses.

As shown, before a golf cart 14 enters the cart path 12, the golf cart 14 traverses a designated start area 16a that is near the first hole. The designated start area 16a is an area designated by course management as representing when a game of golf is considered to have begun. Correspondingly, before a golf cart 14 exits the cart path 12 it traverses a designated stop area 16b, that is near the ninth hole. The stop area 16b is representative of when a game of golf is considered to have ended for the first nine holes. While two areas, a start and stop area 16a–b, are illustrated, the number of areas designated on a course as being representative of the starts/ends of play, as well as their respective locations on the course, are determined based on such factors as the number of holes on the course, how the game is played at a particular course, and the signal transmission means/antenna configuration being used to positionally locate the golfer/golf cart.

For example, on an eighteen (18) hole course a start area is placed contiguous the first hole and a stop area is placed contiguous the eighteenth hole. On an eighteen (18) hole course it is also not uncommon for golfers to play just the front nine or just the back nine; or to play the front nine, take a break, and then play the back nine; or to play the back nine and then play the front nine. In this case, start areas 16a are placed contiguous the first and tenth holes and stop areas 16b are placed contiguous the ninth and eighteenth holes (i.e., four areas would be designated) so the time of play being tracked would reflect how a game is or could be played at the course.

In addition to designating start and stop areas 16a,b, intermediate positions 16c are designated along and about the cart path 12. As illustrated, intermediate positions are disposed proximate the end of each of the first six (6) holes and after the eighth (8th) hole. In general, intermediate positions 16c are located so they generally correspond to the completion of some part of a game (see also discussion regarding FIG. 4, FIGS. 5A–D and FIGS. 6A–D). It is also within the scope of the present invention for intermediate positions to be located at areas other than along the cart path. Further, intermediate positions can be defined so that each segment or hole for the golf course is defined by a beginning and ending point.

The start/stop areas 16a,b and the intermediate positions 16c are each defined by an antenna 18a–c that radiates electromagnetic signals generated by a corresponding transmitter means 20a–c. Although illustrated as a rod type of antenna, the antenna used to define the area includes loop antennas and while a single antenna is illustrated, the areas 16a–c, may be defined by a plurality of antennas as discussed further in connection with FIGS. 2A–C.

As discussed below, a signal receiving, processing and display means 22 is disposed on the golf cart 14 to receive the digital signals radiating from the antennas 18a–c defining start and stop areas 16a–b and the intermediate travel positions 16c as well as the digital signals from the antennas 40a–b, 42,44 for designated restricted areas 30a–c (see FIG. 2A). In this way, a golf cart 14 cannot enter one of these designated areas without the signal receiving, processing and display means 22, located on the golf cart 14, first receiving electromagnetic signals radiating from the antennas 18a–c, 40a–b, 42,44 that define these areas 16a–c, 30a–c. Reference should be made to the discussion for FIG. 4, FIGS. 5A–D and FIGS. 6A–D, concerning the manner in which the signal receiving, processing and display means 22 functions or acts in response to the RF signals being received.

In addition to the designated start/stop areas 16a–b and the intermediate travel positions 16c, there are a number of areas, i.e., restricted areas, around a golf course designated by course representatives (e.g., the course supervisor) where golf carts are excluded because a traveling cart can damage these areas. These restricted areas include tees 46, low lying wet areas, designated practice areas, the putting greens, areas contiguous to the putting greens and on some courses the fairway. There is shown in FIG. 2A a plan view of one hole of a course with a restricted area about the green, the green's restricted area 30a; a restricted area about the tees 46, the tee's restricted area 30b; and where the fairway is designated as a restricted area 30c, the fairway restricted area 30c.

The green's restricted area 30a includes the sand traps fronting the green, the green and the part of the fairway contiguous to the green. Two antennas 40a,b are disposed about the boundary of the green's restricted area 30a and are preferably disposed below grade so that they do not interfere with golf play or maintenance activities such as the cutting of grass. A golf cart 14 cannot approach the green's restricted area 30a without the signal receiving, processing and display means 22, that is located on the golf cart 14, from first receiving an electromagnetic signal radiating from the outer antenna 40a. Similarly, the golf cart cannot enter into the area bounded by the inner antenna 40b, without next receiving an electromagnetic signal from the inner antenna 40b. Preferably, the inner antenna 40b bounds the restricted area 30a so receipt of the electromagnetic signal from the inner antenna indicates that the golf cart 14 is in the restricted area 30a.

Figure 2A:
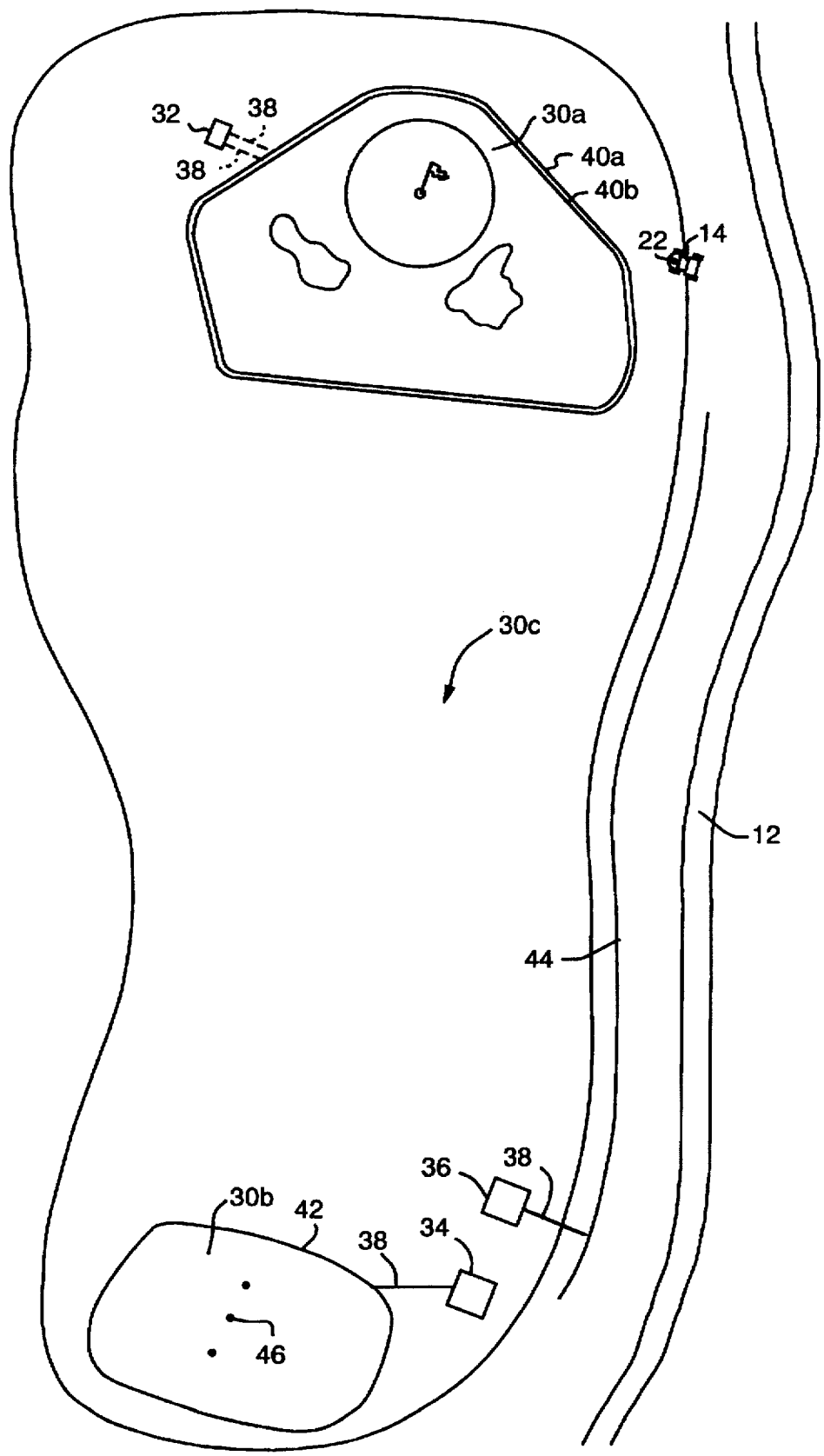
FIG. 2A is a plan view of a portion of the golf course.
Figure 2B:
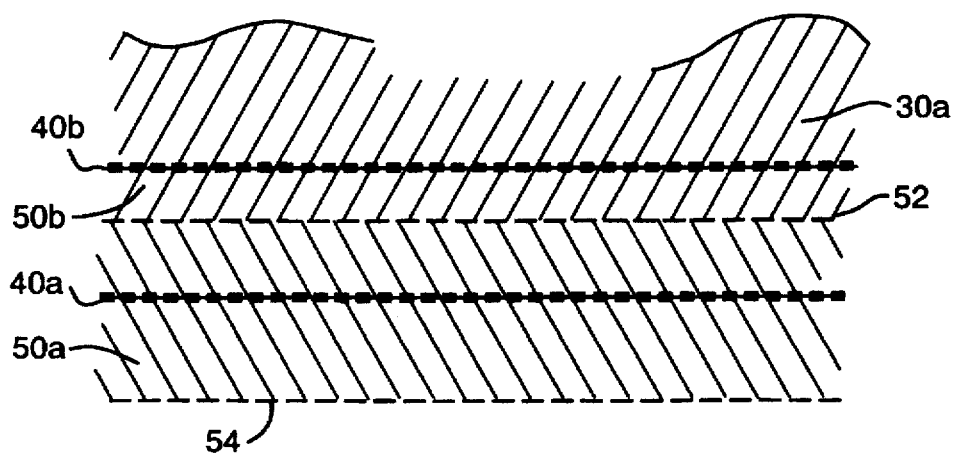
FIG. 2B is a plan view of a portion of a restricted area boundary of FIG. 2A where two antennas encompass the restricted area.

As shown in FIG. 2B, the outer and inner antennas 40a,b are spaced from each other to establish two alert zones 50a,b. The first alert zone 50a extends outward from the second alert zone 50b and covers the area about the restricted area 30a. The first alert zone 50a or the warning zone is where a cart operator is to be given a warning that the cart 14 is approaching the restricted area 30a.

The second alert zone 50b covers both the restricted area 30a and the area between the interface boundary 52, the boundary between the first and second alert zones 50a,b and the inner antenna 40b. The second alert zone 50b is the zone in which a cart operator is to receive a warning that the cart is in a restricted area and in which information wanted by the golf course representatives concerning intrusions by a golf cart 14 into the second alert zone 50b (i.e., the restricted area) is accumulated. In sum, the two alert zones 50a,b provide a basis for establishing different visual and auditory queues for the cart operator, as well as establishing the different monitoring criteria for the golf carts.

As shown in FIGS. 2A, C an antenna 42 is disposed about the tee's restricted area 30b, and an antenna 44 is disposed between the expected travel path for a golf cart 14 (e.g., the cart path 12), and the fairway restricted area 30c. Disposing an antenna 44 between the expected travel path of the golf cart 14 and a restricted area is done when it is not practical or needed to encompass the restricted area with an antenna. The antennas 42,44 are preferably disposed below grade so that they do not interfere with golf play or maintenance activities such as the cutting of grass. In this way, a golf cart 14 cannot approach the restricted areas 30b,c without the signal receiving, processing and display means 22 that is located on the golf cart 14 first receiving an electromagnetic signal radiating from the antenna 42,44.

As explained hereinafter concerning FIG. 2D and FIG. 4, if the signal strength of the electromagnetic signal being received meets or exceeds a specified threshold value, then a golf cart 14 is considered to have crossed over the outer boundary 54 and to be located in the first alert zone 50a or the warning zone. If the cart continues to travel towards the restricted area so the electromagnetic signal being received meets or exceeds another specified threshold value, then the golf cart 14 is considered to have crossed the interface boundary 52, the boundary between the first and second alert zones 50a,b, and to be located in the second alert zone 50b (i.e., cart 14 located in the tee's restricted area 50b). As with the dual antenna arrangement of FIG. 2B, the two alert zones 50a,b provide a basis for establishing different visual and auditory queues for the cart operator, as well as establishing the different monitoring criteria for the golf carts.

The size of the area bounded by a loop antenna 42 is set based on such factors as the size of the area to be protected, the distance a cart is to be permitted to travel before the second warning is provided and before information accumulation is to begin (i.e, the size of the warning area), and the power levels available for the transmitters. Preferably, the power output selected for the transmitter is such that the electromagnetic signals being radiated by the antenna 42 will cover at least the area comprising the first and second alert zones 50a,b.

Figure 2C:
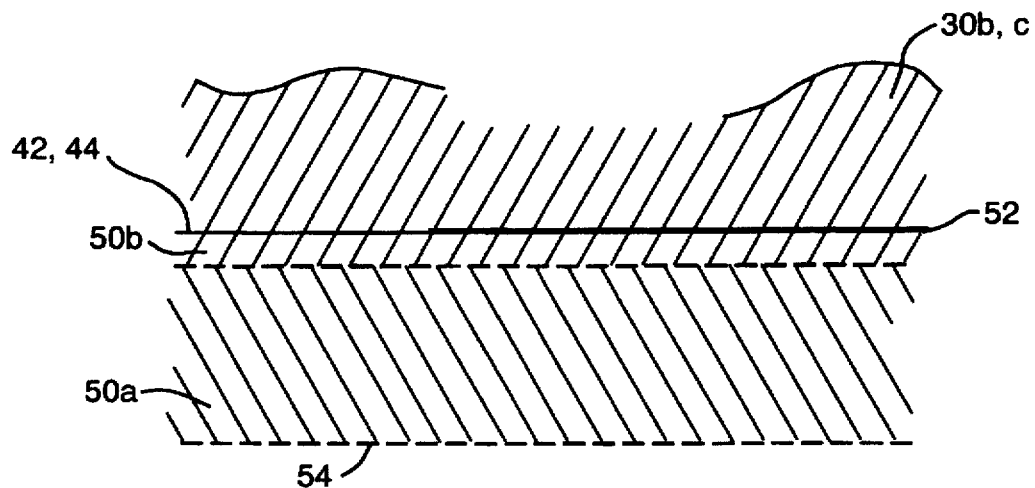
FIG. 2C is a plan view of a portion of a restricted area boundary where one antenna encompasses the restricted area.
Figure 2D:
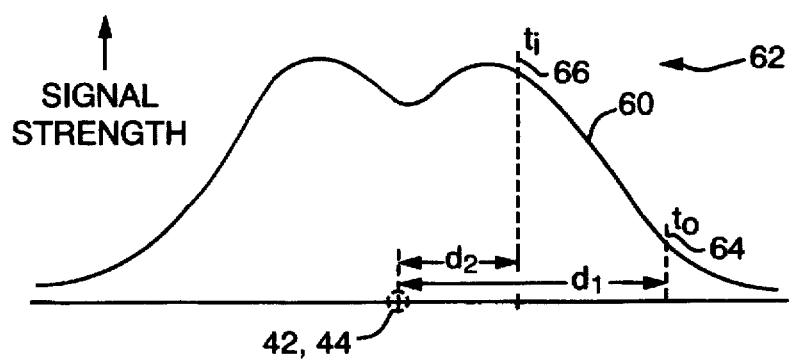
FIG. 2D is a cross section view of a typical above ground electromagnetic field strength distribution for a single antenna.

A cross section of a typical electromagnetic field strength distribution 60 for a single antenna is shown in FIG. 2D. In the illustrated example, the field strength does not reach a maximum at the antenna's location because the directionality of the receiver's antenna typically affects the field distribution, in particular where the maxima occur. Two thresholds 64,66 are specified that define the location of the outer boundary 54 of the first alert zone 50a and the location of the interface boundary 52 (FIG. 2C) between the alert zones 50a,b (FIG. 2C).

When a golf cart 14 approaches a restricted area, in direction 62, the signal receiving, processing and display means 22, receives the electromagnetic digital signals from an antenna. As discussed concerning FIG. 4, the signal strength of the received digital signals is continuously evaluated against defined threshold values. When a first threshold value "$t_o$" 64 is met or exceeded, the cart 14 is considered to have crossed over the outer boundary 54 and to be located in the first alert zone 50a. The first threshold value 64 corresponds to a first distance from the antenna 42,44.

As the cart 14 continues to travel towards the restricted area, the signal strength of the radiated digital signals increases. When the signal strength being evaluated meets or exceeds a second threshold value "ti" 66, corresponding to a second distance from the antenna 42,44, then the golf cart 14 is considered to have crossed over the interface boundary 52 into the second alert zone 60b.

The first and second threshold values 64,66 for the outer boundary 54 and the interface boundary 52 between the first and second alert zones 50a,b are set so a cart operator has sufficient time and distance to change the golf cart's direction after entering the first alert zone 50a and so the cart does not intrude into the second alert zone 50b and correspondingly the restricted area 30b,c. The setting of the second threshold value 66 and correspondingly the interface boundary 52 takes into consideration the estimated speed of the cart, the amount of time typically taken to change the cart's direction, and the minimum distance available for a golf cart 14 to travel before it would enter the restricted area after a signal from the antenna 42,44, that meets or exceeds the first threshold value 64, would be first received.

When two antennas (FIGS. 2A, B) are used to define the first and second alert zones 50a–b of a restricted area, a threshold value is specified for the outer antenna 40a, an outer antenna threshold value, and another threshold value is specified for the inner antenna 40b, the inner antenna threshold value. When the outer antenna threshold value is met or exceeded, the cart 14 is considered to have crossed over the outer boundary into the first alert zone 50a. Correspondingly, when the inner antenna threshold value is met or exceeded the cart is considered to have crossed over the interface boundary 52 into the second alert zone 50b. That is the outer boundary and the interface boundary 52 are each defined by the location or placement of the corresponding antenna 40a,b and the threshold value specified for that antenna. The outer and inner antenna threshold values for the outer boundary and the interface boundary 52 are established giving consideration to the time and distance available for a cart operator to change the golf cart's direction after entering the first alert zone 50a so it does not intrude into the second alert zone 50b.

Figure 2E:
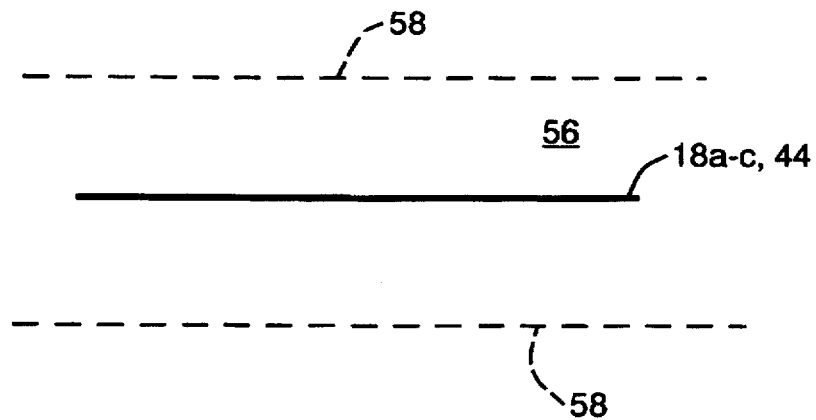
FIG. 2E is a plan view of a portion of an area (e.g., a start area) that is defined by a single antenna.

As indicated above in the discussion for FIG. 1, the start areas 16a, the stop areas 16b and the intermediate travel positions 16c of the golf cart 14 are each defined by the electromagnetic field established by buried antennas 18a–c. For these antennas 18a–c, as shown in FIG. 2E, the electromagnetic signals being radiated define or establish a zone 56 about each antenna 18a–c, where each zone 56 has a boundary 58. The boundary 58 is defined by the power output of the transmitter generating the signals and the specified signal strength threshold values.

When a single antenna 42,44 is used to identify and define the locations of restricted areas 30b,c, the area may have a single alert zone 56 or two alert zones 50a,b. For a single alert zone 56, the zone is defined by the boundary 58 and typically a single warning message (e.g., cart is located in a restricted area) is provided to a cart operator.

Figure 3C:
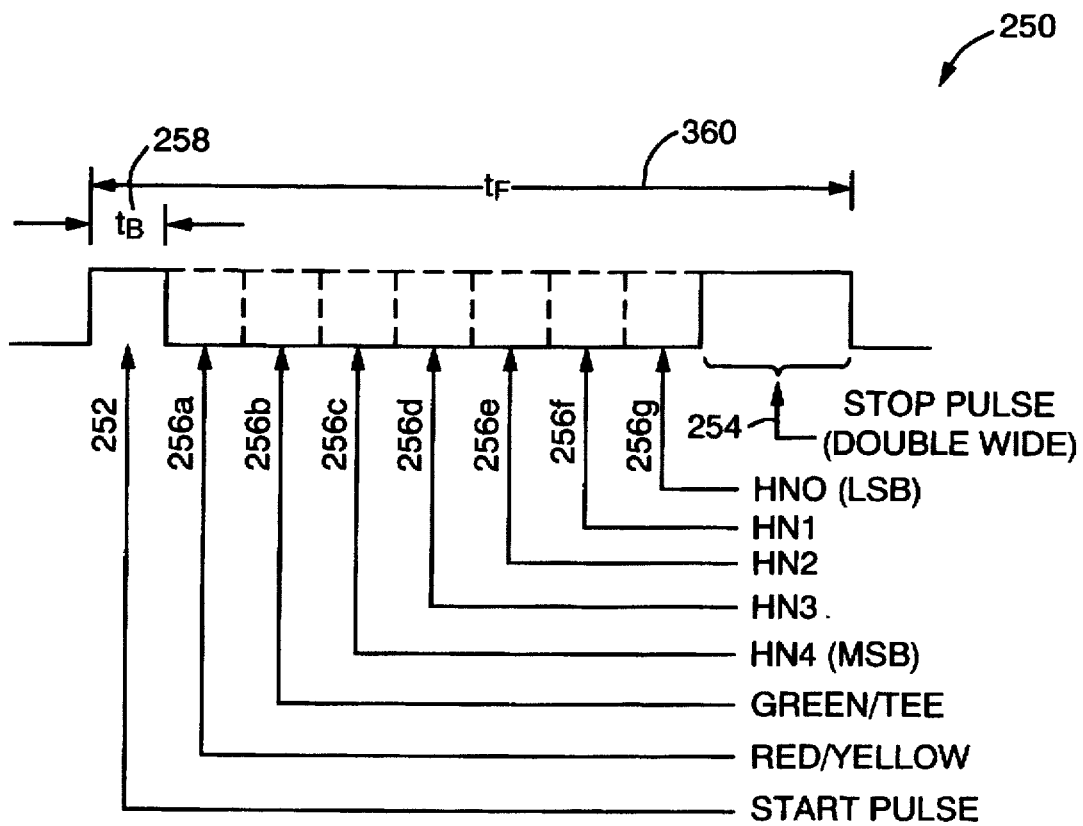
FIG. 3C is one form of the signal structure for a digital signal.
Figure 3A:
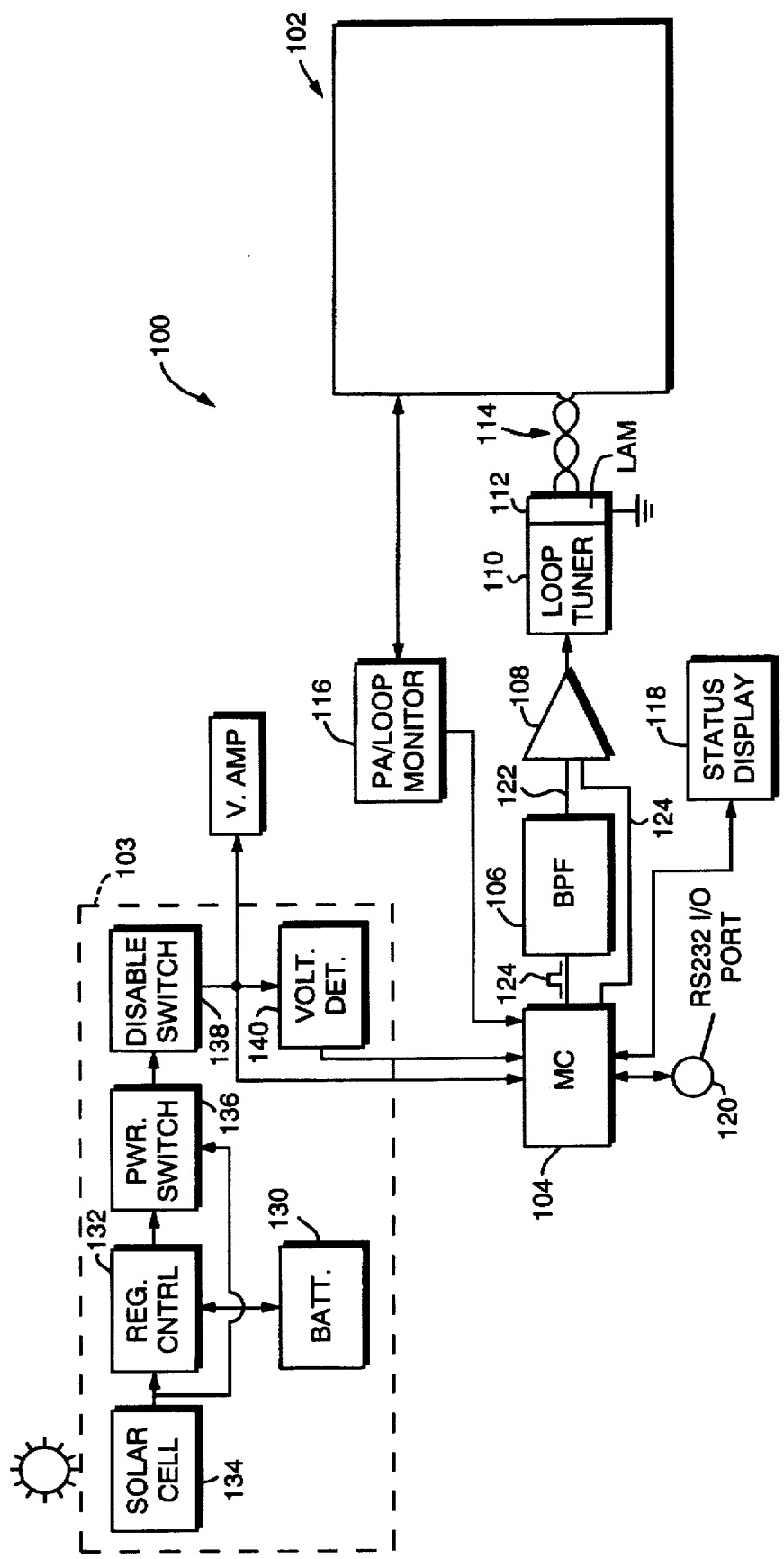
FIG. 3A is a block diagram of one embodiment of an antenna and signal transmission means.

There is shown in FIG. 3A, a block diagram of one embodiment for a signal transmission means 100 and the antenna 102 associated therewith. While a single antenna is illustrated, it should be understood that a signal transmission means 100 is provided for each antenna 40a,b 42 disposed about a restricted area, such as the tee's and green's restricted areas 30a,b or the antenna 44 disposed between the expected travel path for a golf cart 14 (e.g., the cart path 12) and a restricted area, the fairway restricted area 30c. Also, a signal transmission means 100 is provided for each antenna 18a–c that defines the intermediate travel position 16c of a cart 14 and the designated start/stop areas 16a,b of the golf course. Also while a loop antenna is illustrated, other antenna types (e.g. rod type antennas) are within the scope of the instant invention, where the type of antenna being used is selected based on the intended use (e.g., antenna about a restricted area 30a versus an antenna to define a start area 16a) and the electromagnetic field being generated.

The transmission means 100 includes a power supply 103 that continuously provides power to the microcontroller 104, including its internal clock/clock circuit and provides power (i.e., $V_{amp}$) to the power amplifier 108 when it is needed to transmit a signal from the antenna 102. The internal clock/clock circuit of the microcontroller 104 may also be powered by a backup battery (not shown) as is known in the art.

In a preferred embodiment, the power supply 103 consists of a rechargeable battery 130, a regulating and control device 132, and a solar cell 134, where the power to the microcontroller 104 and the power amplifier 108 is supplied by the solar cell 134 and/or the battery 130. The solar cell 134 is also used to recharge the battery 130. The regulation and control device 132, known in the art, controls the power distribution from the battery 130 and solar cell 134, as well as charging of the battery 130.

Since golfing is normally done during daylight hours, the power supply includes a power supply control switch 136 so power is supplied to the microcontroller 104 and power amplifier 108 only when there is daylight (i.e. battery power not depleted by running the transmitter 118 at other times of the day). Preferably, the output from the solar cell 134 is used to control the operation of the power supply control switch 136. Alternatively, a sensor such as a photocell, timers or other means known in the art may be used to control the power supply control switch 136.

The power supply 112 also includes an off season disable switch 138 and a voltage level detector 140. The disable switch 138, which may be a mechanical type of switch, is provided so the battery 130 can be trickle charged during the off season while preventing electromagnetic signals from being radiated. The voltage detector 140 monitors the power supply voltage output and provides an output signal to the microcontroller 104 indicative of the power supply's output voltage.

The signal transmission means 100 is configured so digital signals are radiated by the antenna 102. In one embodiment, the electromagnetic signals are pulse-width modulated to distinguish the signal source or the function of the signal source (e.g., inner and outer restricted area antennas 40a–b). In another embodiment the electromagnetic signals are pulse-group modulated to distinguish and identify the signal source (e.g., the inner restricted area antenna for the second hole). Also, each signal transmission means 100 preferably generates an electromagnetic signal at the same frequency thereby avoiding the need for multiple receivers. While the operation and function of the different embodiments of the signal transmission means 100, 200 and the signal receiving, processing and display means 22 is described using either pulse width or pulse-group modulated digital signals, this is not a limitation. The signal transmission means 100, 200 and the signal receiving, processing and display means 22, may be configured to respectively transmit and receive RF signals using any of a number of digital signal modulation techniques so the signal receiving, processing and display means 22 functions in the fashion as herein described.

When the transmission means 100 is configured to transmit pulse-width modulated signals at the same frequency the signals, in addition to having different pulse widths, are transmitted at different and non-overlapping times. For example, when two antennas 40a,b (FIG. 2A, B) are disposed about a restricted area 30a (FIG. 2A) to define two alert zones 50a,b (FIG. 2B) the signal pulse from the outer antenna 40a will have a different pulse width than the signal pulse from the inner antenna 40b. Also, the pulses will be generated at different and non-overlapping times to simplify the resolution of the different signals. Thus, a signal pulse from an outer antenna 40a is distinguishable from a signal pulse from the inner antenna 40b. Similarly, other pulse widths and signal generation times are used to distinguish signals for other specified features of a golf course including the start and stop areas 16a,b (FIG. 1).

When the transmission means 100 is configured to transmit pulse-group modulated signals, the signals are transmitted at different and non-overlapping times and have a unique and defined signal structure to distinguish the different signal sources and to identify the particular prespecified feature of the golf course (see FIG. 3C discussion). Thus, the signal source for a transmission is distinguished (e.g., a signal from the outer antenna 40a indicating cart 14 is in first alert zone 50a) and the specific feature of the course is identified (e.g., signal is from outer antenna 40a for the green of fifth hole or signal is from stop area 16b of ninth hole). In addition to more clearly distinguishing the signal source, this signal structure provides a mechanism by which more detailed information is obtainable regarding intrusions into restricted areas, time of play and, in general, information about how golf is being played on the course.

While single frequency transmission is preferred, it is within the scope of this invention for the digital signals to be transmitted at different frequencies, thus further distinguishing the signal source. For example, the signal or digital signal being radiated from the inner antenna 40b of FIG. 2A is transmitted at a different frequency than the digital signal from the outer antenna 40a of FIG. 2A. While multiple frequencies introduce additional components (e.g., additional receivers), multiple frequencies do provide another means for distinguishing signal sources.

More particularly, the signal transmission means 100 includes a microcontroller or microprocessor 104, such as a general purpose microcontroller for example a PIC-16C55 by Microchip Technology. The microcontroller 104 includes an internal clock/clock circuit and a memory such as a NVRAM or EPROM for storing information and programming instructions so the microcontroller 104 is automatically booted up. This memory also includes the information for formatting and sending/transmitting the digital signals. The microcontroller 104 may include other means known in the art, such as DIP switches, to provide configuration information (e.g., hole number).

The microcontroller 104, using its internal clock, determines when to transmit each digital signal from the transmission means 100 for the antenna of a given prespecified feature. The microcontroller 104, as well as determining when to send the signal, determines the specific signal to be outputted whether it is a pulse width modulated or pulse group modulated signal.

Preferably, the microcontroller 104 generates the carrier frequency for the signal to be transmitted and modulates the RF signal to generate the digital signal (e.g., square wave signal) at the frequency specified for signal transmission. The bandpass filter 106 removes signal harmonics and transposes the digital square signal to a sine wave (analog) signal as is known in the art. The transmission means 100 alternatively may be configured with a digital signal transmitter that is modulated by the microcontroller 104 to generate the digital signal.

The signal from the bandpass filter 106 is provided to the power amplifier 108, such as a LM383 by National Semiconductor, over line 122. The power amplifier 108 amplifies the signal to the power output required to produce the desired electromagnetic field (e.g., to define the warning area about a restricted area). The microcontroller 104 provides an output signal over a line 124 that causes the power amplifier 108 to be powered up when the signal is to be transmitted. As noted above, except for signal transmission the power amplifier is not normally powered. The transmission means 100 includes a tuner 110 that is a circuit or component, as is known in the art, that matches the impedance of the antenna circuit (e.g., buried antenna 102 and the lighting protection module 112) to maximize transmitted RF power.

A lightning protection or lightning arrester module 112, as is known in the art, is electrically interconnected between the antenna 102, the antenna leads 114, and the tuner 110. The arrester module 112 is provided to protect the antenna 102, the antenna leads 114, the tuner 110, the power amplifier 108, the power supply 103 and associated circuitry from the effects of lightning strikes. Each arrester module 112 is also electrical connected to ground, as is known in the art, so excess energy from the lightning strike, which could damage the above identified components, is dissipated to ground.

Figure 4:
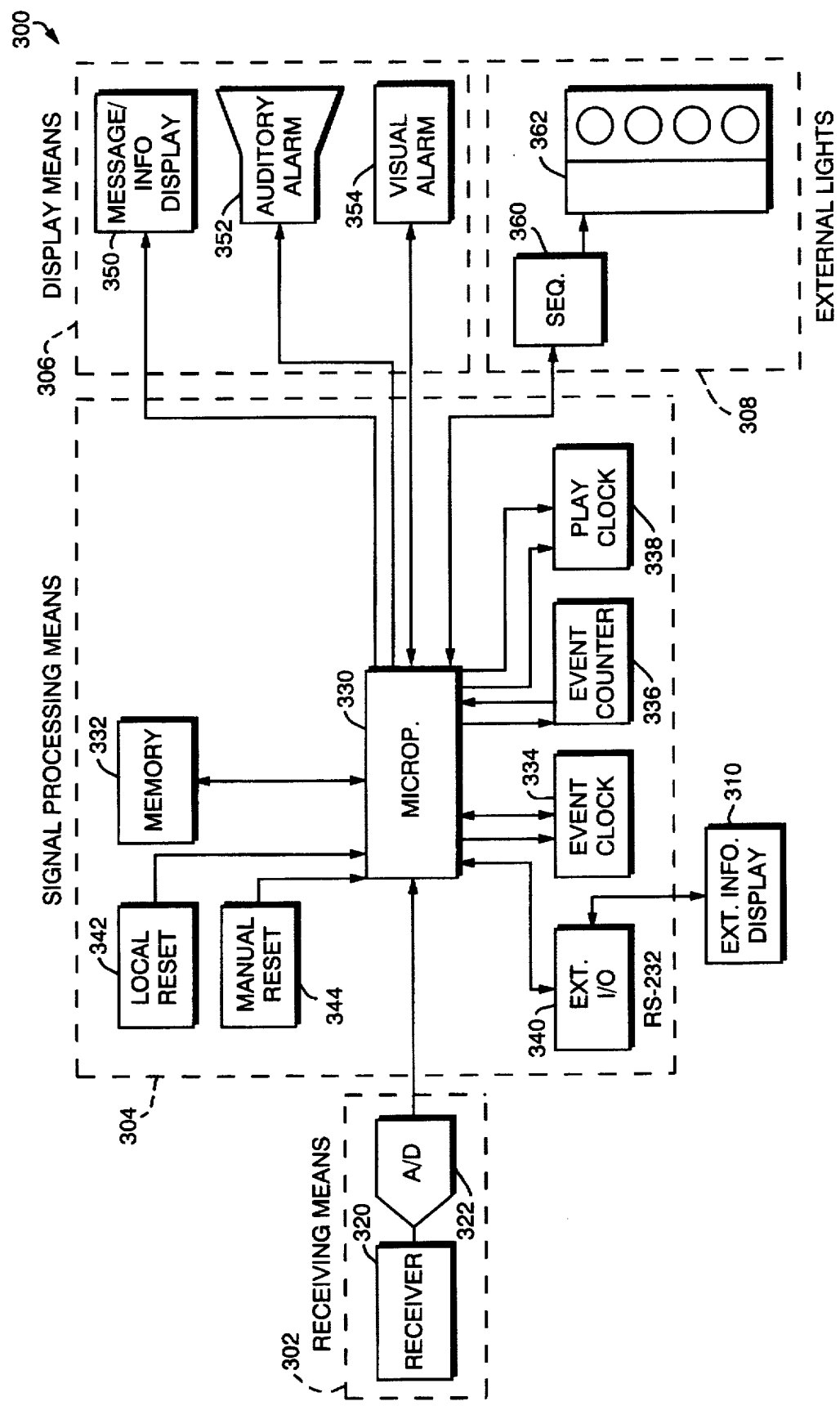
FIG. 4 is a block diagram of an electromagnetic signal receiving, processing and display means.

The antenna leads 114, interconnecting the lightning arrester module 112 to the antenna 102, are typically twisted so an electromagnetic signal is not radiated therefrom and so a false signal is not provided to the signal receiving, processing and display means 22,300 (FIGS. 1,4).

The power amplifier and antenna loop is provided with a loop monitor 116 that monitors the output status of the power amplifier 108 and tuner 110 as well as the electrical integrity of the antenna 102, the lighting arrester module 112 and the antenna leads 114. The loop monitor 116, which may be any of a number of devices known in the art, provides an output signal(s) to the microcontroller 104 representative of the power amplifier/antenna loop's status.

The microcontroller 104, using the inputs from the loop monitor 116 and the inputs from the voltage detector 140 determines the overall status of the transmission means 100 and the status of these selected components/circuits. The microcontroller 104 provides an output signal to a status display 118 so it displays information indicative of transmission means status. The status display 118 is any of a number of devices known in the art, however, the monitors preferably have an LCD display.

The status display 118 preferably provides indications to identify when the power supply voltage (as indicated by the voltage level detector output) falls below a prespecified level; to identify when the power amplifier output has fallen below a prespecified value; to identify when the tuner 110 has failed; or to identify when there is a break in the antenna/arrester module/antenna lead loop. For example, to indicate a low power voltage condition the status display 118 is switched off and the display is made to blink to indicate when other problems or unsatisfactory conditions are present (e.g., electrical integrity loss in antenna loop).

In addition to transmitting digital signals from the antennas disposed at or about prespecified areas/features of a golf course, a transmitter means 100 and its associated antenna 102 is located at a central location (e.g., club house, pro shop) to transmit digital signals that are representative of pre-scripted messages that inform or advise a cart operator of information other than the position of the cart 114 on the golf course. For example, the digital signal sent could be representative of a pre-scripted message that inform's a cart operator of incoming bad weather (e.g., a thunderstorm) and that the operator should seek shelter immediately. Also each cart could be assigned a unique identification code, so that a message (e.g., emergency call at club house) being sent is only received and displayed by the specific cart to which the message is being sent.

The transmitter means 100 at a central location is the same as that shown in FIG. 3A except that the power supply 103 is also configurable, in a manner known to those skilled in the art, to receive power from a central power supply (e.g., an electrical outlet in the club house) and the antenna 102 is disposed above ground. The digital signal being transmitted is preferably pulse-group modulated and the power amplifier 108 may have an increased power output to permit use of a single transmitter (i.e., power output requiring licensed operation-e.g., FCC licensing). If powered from a central power supply, the power amplifier may be powered continuously. It is also within the scope of this invention, for multiple transmitter/receivers to be used in a repeater type of system, as is known in the art.

Figure 3B:
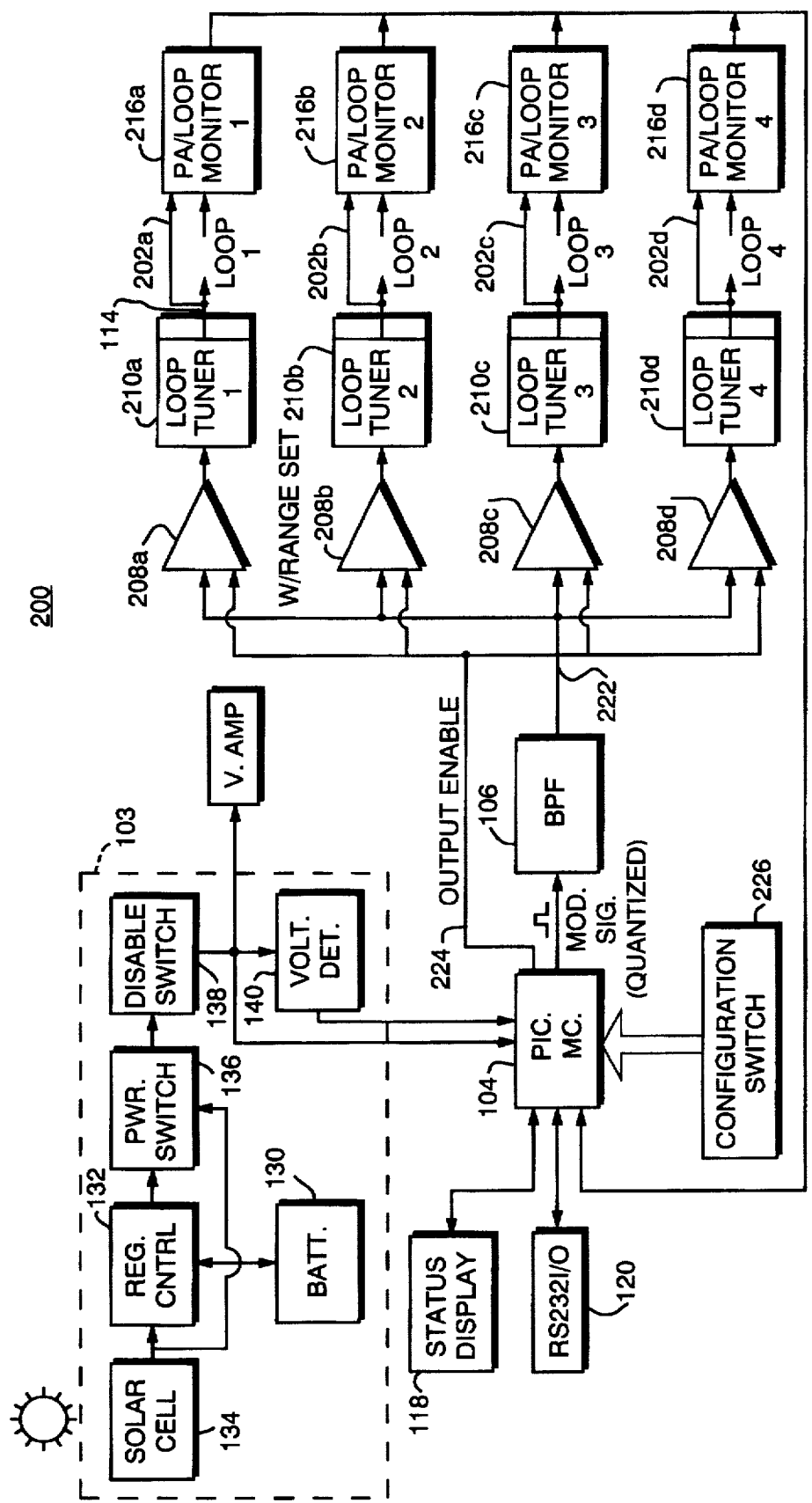
FIG. 3B is a block diagram of another embodiment of an antenna and signal transmission means.

As shown in FIG. 2A, a plurality of antennas 40a,b may be disposed about a restricted area 30a. Also, as shown in FIG. 1 and FIG. 2A, a plurality of antennas for different prespecified features are located in proximity to each other at some places on the golf course, for example, the antennas 18a,c, 42 for the start area 16a and the tee's restricted area 30b as well as one end of the antenna 44 for the fairway restricted area 30c are proximate to each other. There is shown in FIG. 3B, another embodiment of a transmission means 200 configured to output unique digital signals from a plurality of antennas 202a–d.

In this embodiment, the microcontroller 104 is programmed to generate a digital signal for each antenna 202a, where each signal distinguishes and preferably identifies each of the antennas 202a–d. For the above example, separate digital signals would be generated for the start area antenna 18a proximate the first hole, for the antenna 42 that encompasses the first hole tee restricted area 30b, and for the antenna 44 for the fairway restricted area 30c. For a restricted area having two antennas 40a–b to establish the alert zones 50a–b, separate digital signals are generated for transmission from the inner and outer antennas 40a–b. For these examples, digital signals are not transmitted from the unused portions of the transmission means 200. As with the FIG. 3A embodiment, the digital signal being transmitted uses digital pulse modulation techniques (e.g., pulse-width modulation or pulse group modulation) to provide identifying and/or distinguishing information (see FIG. 3C discussion).

While the illustrated transmission means 200 is configured with four amplifier-antenna circuits, this is not a limitation as it is within the scope of the instant invention for the transmission means 200 to be configured with more or less amplifier-antenna circuits. Also, while four complete amplifier-antenna circuits are shown, it is within the scope of the present invention for the transmission means 200 to have less than four complete amplifier circuits in operation as described in the above examples (e.g., two complete circuits and two incomplete circuits).

The microcontroller 104, using its internal clock determines when the digital signal for each of the antennas 102a–d is to be transmitted. Thus, the transmission means 200 repetitively generates a set of non-overlapping digital signals, where each signal is transmitted from the appropriate antenna 102a–d. Preferably the digital signal being transmitted is a pulse-group modulated type of signal so the prespecified feature is distinguished and specifically identified (e.g., the second alert zone 50b of the green's restricted area 30c for the fourth hole).

To accomplish, non-overlapping signal transmission, the microcontroller 104 determines which antenna 102a a digital signal is to be transmitted from and the digital signal that should be transmitted. The microcontroller 104, as discussed above, modulates the carrier frequency to generate the digital signal to be outputted. As described above, this digital signal passes through the bandpass filter 106 that filters the digital signal and transposes it into its analog equivalent. In the illustrated embodiment, this signal is then provided to all the power amplifiers 210a–d. However, the microcontroller 104 outputs a control signal, over the output enable signal line 224, to energize one of the power amplifiers 108a–d at a time, the power amplifier 208a associated with the antenna 202a from which the signal is to be transmitted. Thus, the signal is transmitted only by the specified antenna 208a. Selective energization of the power amplifiers 208a–d for signal transmission also minimizes power consumption thereby extending the life of the power supply's battery 103.

As with the FIG. 3A embodiment, the transmission means tuners 210a–d are circuits/components that match the impedance of each antenna circuit (e.g., each buried antenna 202a–d and the associated lighting protection module 114) to maximize transmitted RF power for a each antenna 202a–d. The status display 118, is configurable to provide a summary status of the transmission means 200 or to provide a status for each antenna/power amplifier 202a/208a loop, as provided by each loop monitor 216a–d, as well as the status for the power supply 103. The other components of the transmission means 200 are as described above in the discussion for FIG. 3A.

As indicated above, the transmission means 200 is preferably configured so digitally modulated signals are transmitted at the same frequency. However, as also provided above this is not a limitation and the transmission means 200 is configurable so that two different frequency signals are transmitted from the antennas 202a–d. For example, the microcontroller 104 determines the carrier frequency to synthesize for a given antenna 208a. Specifically, at least one frequency is set or specified for each prespecified feature (e.g., a start area 16a) to be identified. Alternatively, as discussed above, a digital transmitter is provided for each antenna 208a, where each digital transmitter is configured to transmit at the same or different frequencies.

As noted above, the digital signal being transmitted from each antenna proximate each prespecified feature is preferably pulse-group modulated to distinguish the different signal sources and to identify the prespecified feature on the golf course associated with a given signal source. There is shown in FIG. 3C, one signal structure 250 for a pulse group modulated digital signal that identifies and distinguishes each signal source on the golf course. Each digital signal being sent is provided with a start pulse 252, indicating the beginning of each signal, and a stop pulse 254, indicating the end of each signal. The start and stop pulse 252,254 are each defined by a preset pulse width.

A plurality of pulse positions 256a–g are provided between the start and stop pulses 252,254 that define the binary signal (e.g., 110001) that is being sent and correspondingly the information that identifies the golf course prespecified feature as well as distinguishing the signal source. While seven (7) information pulse positions 256a–g are illustrated, the number of pulse positions/pulses used to define the digital signal that is being sent is dependent upon the amount and type of information to be encoded in the digital signal (i.e., the number can be increased or decreased to reflect the amount and type of information to be transmitted). For example, another pulse position is provided to indicate whether the digital signal being transmitted is representative of a pre-scripted message (see FIG. 4, 5 discussion) or whether the signal is one of those used for monitoring and controlling golf cart operation. Also, another pulse position may be added to indicate whether a single antenna or multiple antennas are being used to define the area at or about the prespecified feature. The following discussion describes the pulse positions 256a–g of the signal structure as it would be used to identify one of the golf course's restricted areas, in particular a restricted area encompassed by two antennas 40a,b and having two alert zones 50a,b (FIG. 2B).

The first pulse position 256a is used to identify which of the two antennas 40a,b disposed about a given restricted area the digital signal is originating from (i.e., the first alert zone antenna 40a or the second alert zone antenna 40b). If a pulse is present at the first pulse position 256a, indicative for example of a binary 1, then the pulse indicates that the signal source is the first alert zone antenna 40a. If no pulse is present at the first pulse position 256a, indicative of a binary 0, then this would indicate that the signal source is the second alert zone antenna 40b.

The remaining pulse positions 256b–g define the specific restricted area the antennas encompass such as the green for a hole, the tees for a hole, or low lying wet area. Since two commonly designated restricted areas are the greens and tees for each hole, the second pulse position 256b, is used to indicate if the restricted area is the green or the tees of a hole. Similarly to the discussion concerning the first pulse position 256a, if a second pulse is present at the second pulse position 256b, then the pulse indicates that the restricted area is a green and if no pulse is present at this pulse position 256b then this would indicate that the restricted area is the tees.

The rest of the pulse positions 256c–g define the binary equivalent of the hole number ( e.g. hole 18) for the green or tee. For example, a pulse at a given pulse position would represent a binary 1 and a missing pulse a binary 0. In this way, a binary number representative of the hole number is transmitted.

For other restricted areas, pulses are provided at the second through seventh pulse positions 256b–g to define a binary number that represents and identifies each such other golf course restricted areas. For non-restricted area applications, the signal structure and meaning ascribed to the encoded information contained in the transmitted binary signal code may be altered from that described hereinabove for restricted areas so these other areas are identified and distinguished.

Alternatively, as discussed above the digital signal being transmitted may be modulated using other digital signal modulation techniques, such as pulse-width modulation, to distinguish the signal source. When using the pulse-width modulation technique, the electromagnetic signal pulses being transmitted have different pulse widths to distinguish the different signal sources. For example, the pulse width of all signals from the first alert zone antenna 40a have a different pulse width than the signals from a second alert zone antenna 40b. Preferably, these signals are also transmitted at different and non-overlapping times to simplify the reception and processing of these digital signals. In this way, signals from the antennas 40a,b for each of the two alert zones 50a,b are clearly distinguishable.

The digital signals from either embodiment of the transmission means 100,200 are received and processed by the signal receiving processing and display means 300, FIG. 4, that includes a receiving means 302, a signal processing means 304, a display means 306 and an external visual alarm 308. Preferably, the receiving means 302 and the associated antenna/transmitter combination establishes an omni-directional antenna/receiver system that is not susceptible to angular orientation of the golf cart 14 in a single plane established by the antenna. The operation of the signal receiving processing and display means 30 relative to the receiving and processing of the digital signals, as well as the operation of the alarms and/or displays of the display means 306 and external visual alarm 308 responsive to the receipt of the digital signals, is discussed in connection with FIGS. 5A–D and FIGS. 6A–D.

The receiving means 302 receives the digitally modulated signals from each antenna and provides output signals representative thereof to the processing means 304 and more particularly, to the microcontroller/microprocessor 330 of the processing means. As indicated above, the transmission means 100,200 can be configured to transmit signals at different frequencies to distinguish the signal source. In this case, there is a receiving means 302 for each frequency signal being transmitted and each of the receiving means 302 provides outputs to the microprocessor 330. These output signals are inputted to the microprocessor 330 through a port dedicated for each receiving means or the output signals are multiplexed, as is known in the art, and the multiplexed signal is inputted to the microprocessor 330.

The receiving means 302 preferably includes a receiver 320, and an analog-to-digital (A/D) converter 322 such as a MAX165 manufactured by MAXIM. The receiver 320 is configured to receive signals at the frequency specified for the transmission means 100,200 of a given antenna 102, 202a–d. Preferably, a single transmission frequency is used so one receiver 320 receives the digital signals being transmitted from any of the antennas that are provided on a golf course for use in controlling and monitoring golf carts 14 and for monitoring playtime. Alternatively, there are a plurality of transmission frequencies and a receiver 320 is provided to receive each of the transmission frequencies in use.

The A/D converter 322 quantizes the RF spectrum or signal being received and provides this quantized output to the microcontroller 330. Specifically, the A/D converter 322 samples the signal being received at a high rate (e.g., samples at approximately 11,000 samples/second) and provides each of these time samples or digitized time samples of the received signal to the microcontroller 330. That is the A/D converter 322 provides an amplitude value for each tick or sample.

The microprocessor 330 using the time samples from the A/D converter 322 determines the digital signal being sent as well as determines the signal strength of the transmitted signal. Preferably, the microprocessor 330 includes a digital signal processor as is known in the art or, alternatively, the microprocessor is configured with a sufficient arithmatic processing capability to perform the signal strength determinations. The transmission means 100,200, as provided above, preferably outputs digital signals that are pulse-group modulated and alternatively, outputs digital signals that are pulse-width modulated. For pulse-group modulated digital signals, the microcontroller 330 using the time slices from the A/D converter 322 determines the content (e.g., binary number) of the transmitted signal, based on the signal structure being used for signal encoding. For example, for pulse-group modulated signals the microcontroller 330 determines the presence or lack thereof of pulses at the defined pulse positions and from this determine the binary encoded information such as the identifier used for a specific signal source. For pulse-width modulated signals, the microprocessor 330 using the time slices determines the width of the received signal and equates that width to a signal source.

As discussed below, the determined signal strength is used by the microcontroller 330 to determine the position of the golf cart or receiving means 302 with respect to a prespecified feature (e.g., restricted area) of the golf course. For example, the determined signal strength is used to determine if the golf cart 114 has crossed the outer boundary 54 of the warning zone 50a(FIGS. 2B,C).

Alternatively, the A/D converter includes a microprocessor or microcontroller that contains an algorithm or program to perform the signal strength determination and to determine the signal being received based on the time slices. In this alternate embodiment, the determined signal strength and the determined digital signal is outputted by the A/D converter 322 to the microcontroller 330 for further processing. The A/D converter 322 used may be any of a number of circuits or devices known in the art for converting the analog electromagnetic signal/signal pulse being received into its digital signal equivalent or for providing a quantized RF spectrum to the microcontroller 330 for processing.

The microprocessor 330 of the processing means 304, based on the determined digital signal and the determined signal strength, determines the position of the receiver 320, and correspondingly the position of the golf cart 14, with respect to the antenna transmitting the digital signal (e.g., based on the known signal distribution profile for the particular antenna/receiver configuration—see FIG. 2D). The position of the golf cart 14 with respect to a transmitting antenna is then equatable to a position of the cart with respect to the prespecified feature associated with the antenna (see discussion for FIGS. 5A–D). For example, a signal from the outer antenna 40a of a dual antenna restricted area configuration indicates that the golf cart's position with respect to the restricted area 30a is the first alert zone 50a (FIG. 2A,B).

Based on the determined position of the golf cart 14/receiver 320, the microprocessor 330 provides control signals and/or signal outputs to the display means 306, the external lights 308, and the event clock 334, the event counter 336 and/or the play clock 338 of the processing means 304. In this way, the microprocessor 330 controls the actuation and operation of receiving processing and display means components, controls the display of information to a cart operator (i.e. a golfer), and controls the accumulation of information that is displayed and/or is retrievable by course representatives. The microprocessor 330 is also re-configurable so control signals are selectively outputted to one or all of the components under its control so all or selected ones are effectively disabled. For example, for a physically challenged golfer, who is typically allowed wider use of a golf cart on a golf course, the control signals to restricted area alarms/warning functions and/or displays would be disabled without affecting other functions of the signal receiving processing display means 22.

A memory 332 is operably connected to the microprocessor 330 so the microprocessor can access and retrieve information, programming and other data and instructions relative to monitoring cart operation and play time as well as for storing information and/or data accumulated regarding playtime and cart operation for retrieval by course representatives. The memory 332 is preferably a read/write type of memory such as NVRAM (non-volatile random access memory). The memory 332, however, can be comprised of multiple sections and/or types of memory (e.g., RAM, ROM, NVRAM) that in combination stores the information, etc. used by the microprocessor 330 in determining the position of the golf cart 14 and stores accumulated information and/or data (e.g., event log information) for use by course representatives in the management of the golf course. The memory 332 is also used to store information relative to the content of a message to be displayed by the display means 306 (e.g., a pre-scripted message).

The event clock 334 and play clock 338 of the processing means 304 are devices or circuits known in the art for providing signal outputs indicating the passage of time or a period of time (e.g., 1 hr. 30 mins. elapsed) or an output of a given time of day (e.g., 11:20 am). Both the event clock 334 and play clock 338 are started and stopped by control signals from the microprocessor 330. As discussed below, the event clock 334 is started when the golf cart 14 or signal receiving, processing and display means 22 is determined to have entered a restricted area and the play clock 338 is started when the golf cart 14 or signal receiving processing and display means passes through a designated start area 16a (FIG. 1).

In one embodiment, the time of play being displayed is the running or elapsed time (i.e. time from when the play clock 338 is started) or a count-up type of time display. Alternatively, the time display is a count-down type of time display that starts with a preset playtime that is stored in the memory 332, and the play clock 338 outputs are used to decrement or count down the displayed time. For example, the time to play an entire round of golf, all 18 holes, is stored in the memory 332 so when the system begins to track time of play, the time specified for playing 18 holes is displayed initially to the cart operator. In an alternate embodiment, time of play is tracked for the entire game and for each segment or hole of the course (see discussion for FIGS. 6A–D), where the predetermined time interval for each segment or hole along with a hole identifier is stored in the memory 332. For a count down type of time display, the microprocessor 330 determines which time interval is to be displayed and outputs control signals so the display initially reflects the appropriate time interval. Thereafter, the microprocessor 330 causes the time display to be updated based on clocking signals from the play clock 338. The microprocessor 330 also preferably outputs control signals to control the operation of the play clock 338 and for tracking the elapsed time for each course segment being played (i.e., for each time interval). The operation of the signal receiving processing and display means 30 for this embodiment of playtime tracking and monitoring relative to receiving and processing digital signals, as well as the operation of the alarm and displays of the display means 306 is discussed further in connection with FIGS. 6A–D.

The microprocessor 330 provides an output signal to the event counter 336, incrementing the counter 336, after the microprocessor 330 determines that a golf cart 14 has entered a restricted area. The event counter 336 continues to increment by one each time a signal is sent from the microprocessor 330 representative of the golf cart 14 having crossed over an interface boundary 52 into a restricted area. As such, the event counter 336 contains a running total of the number of times a cart has entered into the second alert zone 128b or the restricted area. Reference to a golf cart 14 being located at a specific position on the golf course (e.g., in a restricted area, in a start area) shall also be understood to mean location of the signal receiving processing means at the same location, whether that means is located on a cart or is being hand held by a golfer.

While discrete components are shown for the event clock 334, the event counter 336 and the play clock 338, this is not a limitation. The microprocessor 330 using a program or algorithm, in conjunction with the microprocessor's internal clock, can provide outputs of elapsed time and keep track of elapsed time. Further, a data field can be established in the microprocessor or in the memory 332, that is incremented by the microprocessor's outputs (e.g., increment data field by one as is done for the counter 336).

The message display means 306 at least includes a message/information display 350 and an auditory alarm 352. The message/information display 350 is preferably an LCD type of display and the associated drivers. Based on the control and signal outputs from the microprocessor 330, the message/information display 350 displays such things as a pre-scripted warning message indicating the cart's position (e.g., in a restricted area), the time of play for the game, a pre-scripted message regarding slow play and, if restricted areas have been intruded, information indicating the number of such intrusions and the amount of time spent in restricted areas (See FIG. 5). The control and signal outputs from the microprocessor 330 are used to display other information unrelated to the game such as the local time (e.g. 12:30 P.M.) and other informational messages, for example warning a cart operator to seek shelter). In addition to an LCD type of display, the message/information display 350 may be any other means known in the art for visually presenting information and messages (e.g., an LED/LCD number display, a backlit message or a combination thereof).

The auditory alarm 352, in response to control signals from the microprocessor 330, generates an auditory signal as a redundant and separate means of informing the cart operator of the cart's position with respect to a prespecified golf course feature (e.g., restricted area). The auditory alarm 352 also draws the attention of the cart operator to the signal receiving processing and display means 300 so the cart operator reads the information and/or message being displayed on the message/information display 350. Preferably, there is a unique auditory signal being generated to distinguish one position of the cart with respect to other cart positions (e.g., constant buzzing for restricted area intrusions and chirping signal for warning area intrusions). The auditory alarm is any circuit, device, apparatus or means known in the art for generating auditory signals.

The display means 306 includes at least one visual alarm 354 responsive to control signals from the microprocessor 330. Each visual alarm 354 provides a visual signal to a cart operator as another way of alerting the cart operator of the position of the cart with respect to a prespecified course feature and/or to draw the cart operator's attention to the message/information display 350 so the cart operator reads the information/message being displayed thereon. While one visual alarm 354 is illustrated, there may be more than one visual alarm and/or the visual alarms may be lighted by different colored lights (e.g., yellow/red lights) to indicate the position of the cart 14 with respect to the restricted area or prespecified feature.

The external visual alarm 308 is also actuated by control signals from the microprocessor 330 so course rangers can easily identify carts which are not complying with specific course policy regulating operation of golf carts on the golf course such as not operating a golf cart 14 in designated restricted areas (i.e., in the second alert zone 50b). Preferably, the external visual alarm 308 consists of a plurality of lights 362, such as halogen lights, which are lighted sequentially (i.e., sequentially energized) by means of a sequencer 360. Alternatively, any means known in the art for generating a visual external alarm (e.g., a strobe light, a strobe colored light) may be used.

The microprocessor 330 is connected to an input/output (I/O) port 340, such as an RS232 port, so the microprocessor 330 and the memory 332 operably connected thereto can be updated/programmed with instructions and information such as signal strength threshold values and the digital signal information to distinguish signal sources as well as identifying prespecified areas to be monitored. Additionally the I/O port 340 is used by course representatives to retrieve data and/or information relative to cart operation and time of play from the memory 332 or to display the information on an external information display 310. The information being displayed or retrieved is used by course representatives for management of the course and holding cart operator's accountable for their use of the cart on the course. For example, based on the retrieved information a course representative could send someone out to the identified restricted area, to determine if there was any damage caused by the cart's intrusion into this area.

The processing means 304 includes a local reset 342 and a manual reset 344. Both resets 342,344 each provide a signal to the microprocessor 330 which in-turn outputs a signal causing the signal receiving processing and display means 300 to be reset in one of two ways. The local reset 342, which is under the control of the cart operator, is provided so that certain information and/or messages being displayed on the message/information display 350 can be cleared. For example, if a seek shelter message is transmitted to a cart operator, then the operator is given the capability to clear this message from the message/information display 350 presumably after the operator has read the message. In general, the certain information and/or messages do not include those which are automatically generated or cleared by signals from an antenna for designating restricted areas 30a–c, start/stop areas 16a,b and/or intermediate cart travel positions 16c (FIG. 1) or the information being accumulated for later use by course representatives. Alternatively, the resets 342,344 are directly coupled to the components (e.g., event counter) that are to be reset.

As noted above, the auditory alarm 352 and/or the visual alarm 354 are used to draw the operator's attention to the message/information display 350 and correspondingly to the message or information being displayed. In these situations, the local reset 342, when actuated terminates the auditory or visual alarm signal. The local reset 342, however, is not used to turn off the auditory alarm 353, the visual alarm 354 or the external visual alarm 308 when a cart is in a restricted area.

The manual reset 344, which is under the control of course representatives, is provided so the golf cart 14 can be used again and again while providing the necessary information for each operator of the cart. When the microprocessor 330 receives the manual reset signal, the microprocessor 330 outputs signals causing the play clock 338, the event counter 336 and the event clock 334 to be reset or initialized (e.g., the event counter reset to zero) as well as clearing or initializing any data fields containing old information concerning prior cart operation or playtime. The microprocessor 330 also outputs signals to the message and information display means 350, the auditory alarm 352, the visual alarm 354 and the external visual alarm 308 that clears displays and shuts off the alarms 352,354,308. In this way, if a cart's signal receiving, processing and display means 300 misfunctions and remains locked in one of its alarm states, a course representative can clear the erroneous alarms and display. As with the local reset 342, the manual reset 344 is alternatively directly coupled to the components to be reset. The manual reset also provides the means for course personnel (e.g., rangers) to view receiver violation information anytime during normal play by displaying the violation information on the LCD screen.

The operation of the signal receiving, processing and display means 300 (FIG. 4) relative to one embodiment for receiving and processing the digital signals being transmitted and the operation of the alarms and/or displays in response to the digital signals being received is best understood by reference to the flow charts illustrated in FIGS. 5A–D and the following discussion. It should be understood that while the following discussion describes the process in seriatim, the operational steps described may be performed in parallel, the steps may be performed in a different sequence than that described and illustrated and more than one received digital signal may be evaluated at a time. Reference should be made to FIGS. 3A–B and FIG. 4 for specific components included in the following discussion.

The control and monitoring process is started, step 400, each time a golfer is given a golf cart 14 for use during a game of golf. Since golf courses typically have areas about the club house where cart operation is not allowed, the cart control and monitoring process is not just restricted to the course proper. Before a golf cart 14 is given to a golfer for use, a course representative resets the signal receiving processing and display means 300 as discussed above concerning FIG. 4.

After the control and monitoring process is started, the cart's signal receiving processing and display means 300 monitors the bandpass or frequency being used by the signal transmission means 200, step 402. As indicated above while single frequency operation is preferred, different frequency signals may be transmitted. In this event, the signal receiving processing and display means 300 monitors each frequency being used to transmit the digital signals. In general, when the microprocessor 330 is not evaluating the received digital signals, the cart's signal receiving processing and display means 300 monitors the bandpass or bandpasses for the frequencies being used for digital signals.

The signal receiving, processing and display means 300 monitors the bandpass(es) for the presence of one of the digital signals radiating from antennas that identifies at least the signal source and more particularly identifies the signal source and the prespecified course feature associated with a given signal source. As noted above, the digital signal being transmitted preferably is pulse-group modulated so that a binary signal, representative of the signal source and the prespecified feature, is outputted to the signal receiving and processing means. Upon receipt of a digital signal, the microprocessor 330 using information stored in the memory 332 determines the content of the digital signal as well as determining the signal source (e.g., a start area antenna 18a, FIG. 1). If, the digital signal is pulse-width modulated, the microprocessor 330 determines the signal source using the information stored in the memory (i.e., relation between the pulse width and the type of signal source—e.g., a restricted area antenna is the signal source).

The signal receiving processing and display means 300 evaluates each received digital signal to determine if it is the digital signal from a start area antenna 18a (FIG. 1), step 404. If a start area signal is detected (YES), then the microprocessor 330 outputs a control signal to start the play time clock 338, step 430. After being started, the play time clock 338 continues to run and periodically outputs a signal to the microprocessor 330 representative of the amount of time that has elapsed since the clock was started. Alternatively, the microprocessor 330 periodically queries the play time clock 338 to determine the amount of time that has elapsed. The microprocessor 330, based on the play clock outputs, outputs signal(s) to the message/information display 350, causing the display 350 to display the elapsed play time as well as updating the time being displayed as the elapsed time changes, step 432. After the play time clock 338 is started, the signal receiving processing and display means 300 returns to monitoring the bandpass, step 402, for digital signals.

If a start area signal is not being detected (NO-step 404), then the microprocessor 330 evaluates the received digital signal to determine if it is a digital signal radiating from an antenna 18c (FIG. 1) representative of intermediate travel positions of a golf cart, step 406. This type of information (e.g., how long it takes to play a given hole or holes) can be used by course management to, for example, better establish the start or tee off times for golfers.

If an intermediate position signal is detected (YES), then the microprocessor 330 writes the time on the play clock 338 (i.e., the time of play) to the memory 332, step 438. Alternatively, the microprocessor 330 compares the latest play time with an earlier stored time to determine the amount of time taken to play between two intermediate positions and the determined differential time is written to the memory 332. If the digital signals are pulse-group modulated, then the information written to the memory 332 also includes the specific intermediate position passed through (e.g., the intermediate position at end of first hole) or identifies the two intermediate positions associated with a stored differential time (e.g., time between first and second positions or the time to play the second hole).

For pulse-width modulated digital signals, the microprocessor 330 evaluates the received signal to see if the signal's pulse width corresponds to that used to identify a start area, a stop area or an intermediate travel position. For pulse-group modulated signals, the microprocessor 330 evaluates the binary signal encoded in the received digital signal to determine if it is a signal from an antenna for a start area, a stop area or an intermediate travel position.

If an intermediate area signal is not detected (NO-step 406), then the microprocessor 330 evaluates the received digital signal to determine if it is a digital signal radiating from a stop area antenna 18b (FIG. 1), step 408. If a stop area signal is detected (YES), a control signal is outputted by the microprocessor 330 to stop the play clock 338, step 434. The elapsed time reflected on the clock 338, is thereafter written to the memory 332, step 436. If the digital signals being radiated are pulse-group modulated, then the microprocessor 330, based on the information encoded in the signal, writes to the memory 332 additional information related to the time of play being stored such as whether the time is for 18 holes, the front nine holes and/or the back nine holes.

Alternatively, the information contained in the pulse-group modulated signals is used to automatically re-initialize the play clock 338 after play is considered stopped (e.g., 18 holes of golf played) without changing the displayed time or without altering or deleting the times stored in the memory 332. Also, this information may be used to control the storage of play times for each set of nine holes played. After completing the above actions, the signal receiving processing and display means 300 returns to monitoring the bandpass, step 402, for further digital signals.

If a stop area or intermediate travel position signal is not detected (NO-steps 406, 408), then the microprocessor 330 evaluates the received digital signal to determine if it is a digital signal indicative of a golf cart being in the first alert zone 50a or the warning zone, step 410. The microprocessor 330 evaluates the output signals (e.g., the signal strength values) from the receiving means 302 to determine if a golf cart 14 is crossing over the outer boundary 54 (FIG. 2B) and entering the warning area or first alert zone 50a, step 450. As discussed above, when the microprocessor 330 determines that the threshold signal strength value corresponding to the outer boundary 54 is met or exceeded, the cart 14 is considered to have crossed over the outer boundary 54 and entered the first alert zone 50a. The microprocessor 330 is also configured to distinguish between a golf cart 14 entering from the first alert zone 50a from outside the zone and a cart that is re-entering the first alert zone 50a from the second alert zone 50b (FIG. 2B) as discussed below.

If the cart is entering the first alert zone 50a or warning zone from the outside (YES), then the microprocessor 330 outputs control signals causing the message and information display 350 to display the appropriate message (e.g., approaching a restricted area please leave) as well as actuating the auditory and/or visual alarms 352,354 to generate the visual and auditory signal specified for a warning zone intrusion, step 452. These alarms 352,354 and messages remain on/displayed until they are reset when the golf cart 14 exits the first alert zone 50a or until they are changed when the cart 14 enters the second alert zone 50b, the restricted area. After completing the actions of step 452, the signal receiving processing and display means 300 returns to monitoring the bandpass, step 402, for further digital signals.

For pulse-width modulated digital signals, the microprocessor 330 evaluates the received digital signal to see if the signal's pulse width corresponds to that used to identify a warning zone, for a dual antenna configuration or that used to identify an antenna for a restricted area having a single antenna configuration. For pulse-group modulated signals, the microprocessor 330 evaluates the binary signal encoded in the received digital signal to determine if it is a signal from the outer antenna 40a (FIG. 2A) of a dual antenna configuration or the signal from the antenna 42 (FIG. 2A) for a restricted area having a single antenna configuration. A similar evaluation is made to identify restricted areas.

In addition to entering the first alert zone 50a from the outside, a golf cart 14 enters (i.e., re-enters) the first alert zone 50a when it exits the second alert zone 50b. Thus, if the cart 14 is determined not to be entering the first alert zone 50a from the outside (NO-step 450), then the microprocessor 330 determines if the cart is exiting the second alert zone 50b and re-entering the first alert zone 50a, step 454. In one embodiment, the microprocessor 330 determines that a golf cart is leaving the second alert zone 50b and re-entering the first alert zone 50a, when the receiving means 302 is not receiving signals indicative of the cart being in the second alert zone 50b.

The electromagnetic field established to define the second alert zone, however, may in some cases not cover the entire area because of the size of the restricted area and/or the strength of the signal being radiated. As such, the microprocessor 330 is preferably configured to determine that a golf cart 14 is reentering the first alert zone 50a and exiting the second alert zone 50b when the receiving means 302 is no longer receiving signals indicative of the cart being in the second alert zone 50b and is receiving signals indicating that the cart is in the first alert zone 50a. In addition, the microprocessor 330 is configured so if only second alert zone signals of decreasing signal strength are being detected before the second alert zone signals are lost, the microprocessor 330 considers the cart to be still located in the second alert zone 50a.

More particularly, the microprocessor 330 makes the determination based on an evaluation of measured signal strengths of at least the second alert zone signals to a specified threshold value and further based on the measured signal strengths for first and second alert zone signals. For example, if signal strength of the second alert zone 50b is below a threshold value and the signal strength of the first alert zone is above another threshold value, then the microprocessor 330 determines that the cart 14 is exiting the second alert zone 50b and is re-entering the first alert zone 50a. The microprocessor 330 may also evaluate the signal strengths of signals from the first and second alert zones 50a,b to determine if decreasing signal strength values for the second alert zone signals are coincident with increasing signal strength values for first alert zone signals.

If the microprocessor 330 determines that the cart is reentering the first alert zone from the second alert zone (YES-step 454) then the microprocessor 330 outputs control and information signals stopping the event clock 334 and writing information accumulated regarding the second alert zone intrusion to the memory 332, step 456. If the digital signal received is pulse-width modulated, then the number of restricted areas intruded into and the elapsed time on the event clock 334 is written into the memory 332. If the digital signals are pulse-group modulated, then the specific restricted area intruded and/or the elapsed time on the event clock 334 is written to the memory. Alternatively, the amount of time the cart was in the identified restricted area is written to the memory.

The microprocessor 330 also outputs control signals to turn the external visual alarm 308 off and to change the message and information display 350 and the visual and/or auditory alarms 352,354 to reflect re-entering of the first alert zone 50a, steps 458,460. The information and message display 350 is changed to display the warning message for the first alert zone 50a. If restricted area information (e.g., time in restricted areas) is displayed when a cart has intruded a restricted area but is suppressed for all other times (e.g., during normal cart operation), then the message/information display 350 is also changed so restricted area related information is no longer being displayed. After taking these actions, the signal receiving processing and display means 300 returns to monitoring the bandpass, step 402, for further digital signals.

A golf cart 14 in the first alert zone 50a departs this zone when it crosses the outer boundary thereby going outside the first alert zone 50a or by crossing the interface boundary 52 and entering into the second alert zone 50b or restricted area. If a warning zone or first alert zone signal is not detected (NO-step 410), the microprocessor 330 makes an evaluation to determine if this is an indication of the golf cart 14 exiting or leaving the first alert zone 50a to the area outside of the first alert zone, step 412. In one embodiment, the microprocessor 330 determines that the cart 14 is exiting the first alert zone 50a when the measured signal strengths for the first alert zone signals drop below a specified threshold or alternatively when the first alert zone signals are not being received. Alternatively, the microprocessor 330 is configured to evaluate the measured signal strengths for a stream of prior received first alert zone signals to determine if the golf cart 114 is traveling in a direction that corresponds to a cart leaving the first alert zone and returning to other areas of the golf course that lie outside of the first alert zone.

If the golf cart 14 is determined to have left the first alert zone 50a to the outside (YES), then the microprocessor 330 outputs control signals to return the message and information display 350 and the visual and/or auditory alarms 352,354 to their initial non-alarm state, step 440. That is, any visual and/or auditory alarms 352,354 are automatically shut-off or stopped and the information display 350 is automatically cleared of any warning messages. After taking these actions, the signal receiving processing and display means 300 returns to monitoring the bandpass, step 402, for further digital signals.

As indicated above, a golf cart 14 also exits the first alert zone 50a when it enters the second alert zone 50b.

Accordingly, if the cart is determined not to have left the first alert zone to the outside (NO-step 412), then the microprocessor 330 makes an evaluation to determine if the golf cart 14 is in the restricted area or the second alert zone 50b, step 414. If restricted area signals are being received (YES), then the microprocessor 330 makes another evaluation to determine if the golf cart 14 is entering the second alert zone 50b (i.e., cart crossing over or having crossed over the interface boundary 52, FIG. 2B) step 470. As discussed above, the cart is determined to be crossing or having crossed over the interface boundary 52, in one of two ways, if the microprocessor 330 determines that a threshold value set for the inner antenna of a dual antenna configuration is met or exceeded or if the microprocessor 330 determines that a second threshold value is met or exceeded for a single antenna configuration (see FIG. 2D). If the microprocessor 330 determines that the cart 14 is already located in the second alert zone 50a, that is the cart is not crossing over the interface boundary 52 (NO), then the signal receiving, processing and display means 300 returns to monitoring the specified bandpass, step 402, for digital signals (i.e., no action taken by microprocessor 330).

If the golf cart 114 is determined to be crossing over the interface boundary and entering into the second alert zone 50b (YES), then the microprocessor 330 outputs a control signal(s) that changes the auditory and/or visual alarms 352,354 and changes the message being displayed on the message/information display 350, from the alarms and displayed message associated with the first alert zone 50a to that associated with the second alert zone 50b, step 472. The microprocessor 330 also outputs a control signal(s) causing the event counter 336 to increment by one, starting the event clock 334 to start and actuating the external visual alarm 308, steps 474,476, 478. The external visual alarm 308 is actuated so nonconforming golf carts 14 can be identified by course representatives in particular course representatives at other areas of the golf course.

As indicated above, these alarms 352,354,308 and the message/information display 350 are not reset or changed until the microprocessor 330 determines that the golf cart is exiting or has exited the second alert zone 50b and is entering or has entered the first alert zone 50a. In effect, the control signals from the microprocessor 330 causing the actions associated with the golf cart 14 being in the second alert zone 50b are sealed in until a determination is made by the microprocessor 330 to change/reset the alarms, etc. After the above actions relative to a determination that the golf cart 14 is crossing over the interface boundary 52 are initiated/completed, the signal receiving, processing and display means 300 returns to monitoring the specified bandpass, step 402, for digital signals.

If the cart is determined not to be in the second alert zone (NO-step 414), then the microprocessor 330 evaluates the received digital signal to determine if it is one of the digital signals representative of a pre-scripted informational message, step 416. As indicated above, there are a number of situations where it would be desirable to provide information directly to a cart operator (e.g., weather warnings, or important message/call at club house). If the microprocessor 330 determines that the received signal is one of these pre-scripted message digital signals (YES), then a control signal is outputted to the display means 308 causing the appropriate message to be displayed and, where applicable, control signals are outputted to the visual and auditory alarms 352,354 to provide auditory and visual cues to draw the operator's attention back to the message/information display 350. After the above actions relative to displaying the pre-scripted message are completed the signal receiving, processing and display means 300 returns to monitoring the specified bandpass, step 402, for digital signals.

Since the message/information display 350 is not automatically cleared of any such pre-scripted messages, the cart operator resets the display 350 using the local reset 342, step 442. If the auditory and/or visual alarms 352,354 were actuated to draw the operator's attention to the message/information display 350, the actuation of the local reset 342 returns these alarms 352,354 to their initial non-alarm state. The local reset 342, however, does not reset restricted area alarms and messages nor permit deletion of information being stored for retrievable by course representatives.

If the digital signal being received is determined not to be a pre-scripted informational message digital signal (NO-step 416), then the microprocessor 330 determines that the signal being received is an erroneous or spurious signal and takes no action regarding setting alarms or messages, step 418. Thereafter, the signal receiving processing and display means 300 returns to monitoring the bandpass, step 402, for further digital signals. The microprocessor 330 when it determines that an erroneous or spurious signal is being received may increment a false message counter in the memory 332 to indicate the receipt of such a signal along with writing the play time associated with the receipt of the such a signal to the memory 332.

Figure 5A:
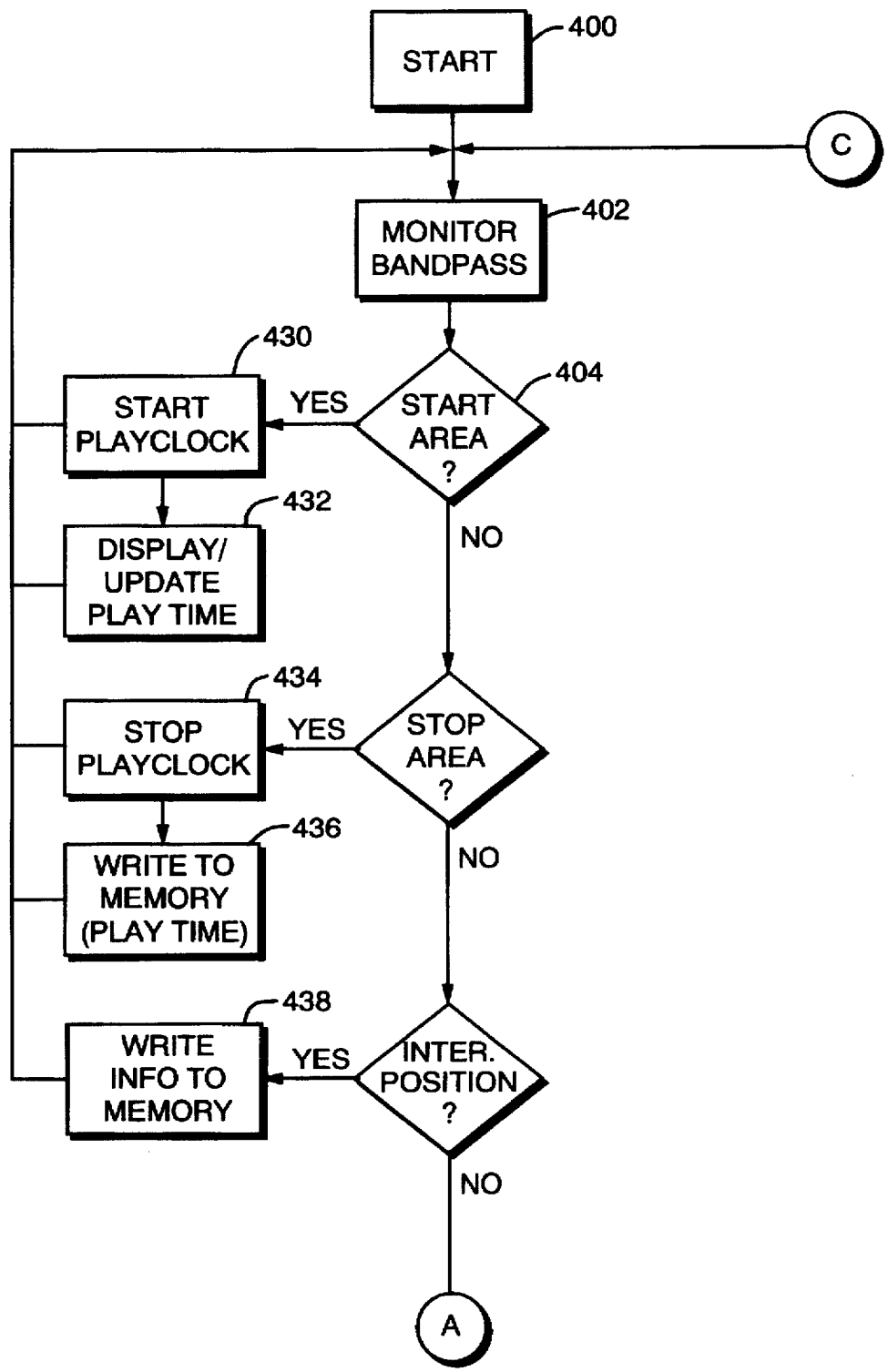
FIGS. 5A–D is a flow diagram of the methodology for monitoring and controlling cart operation and monitoring playtime.

An alternate embodiment to the methodology of FIG. 5A is shown in FIGS. 6A–D. As shown, after going through the process illustrated on FIG. 6A, the process continues with that shown on FIGS. 5B–D. That is the control and monitoring process for time of play and restricted areas is a combination of FIGS. 6A–D and FIGS. 5B–D. It is within the scope of the present invention for the process for monitoring time of play and restricted areas to be separated so either process can be performed separately (e.g., monitor only time of play).

In this embodiment, the digital signals from the antennas at the start area(s), stop area(s) and/or intermediate travel or game position(s) are used to trigger specified or predetermined time intervals. Further, the time of play for a given portion or segment of the course is monitored and warnings provided to the golfer if a specified time interval is exceeded. Each of the predetermined time intervals is representative of the amount of time, as determined by course representatives, to play a given portion of the course (e.g., one of the holes). For example, a time interval of 25 minutes would be specified as the time for a golfer or group of golfers to play the first hole. In this way, the golf course sets the pace for playing golf on the course. Thus, if a golfer finishes each segment of the course at or before the predetermined time intervals expires, then the golfer should not delay the game of the later starting golfers (i.e., slow play is avoided).

While the following discussion describes the process of FIGS. 6A–D in seriatim, it is within the scope of the present invention for the described operational steps to be performed in parallel, for the operational steps to be performed in a different sequence than described as well as having more than one digital signal being evaluated at a time. Reference should also be made to FIGS. 3A–B and FIG. 4 for the specific components included in the following discussion.

As provided above in the discussion regarding FIG. 5A, the control and monitoring process is started, step 400, each time a golfer is given a golf cart 14 for use during a game of golf, where the cart mounted signal receiving processing and display means 300 is reset before the cart is given to a golfer for use. After the control and monitoring process is started, the cart's signal receiving processing and display means 300 monitors each frequency being used by the signal transmission means 200, step 402. In addition to the following, reference should be made to the discussion above regarding FIG. 5A for other details concerning the microprocessor 330 and memory 332 relative to determining the signal source and/or the pre-specified feature from the transmitted digital signal of steps 404,406,408.

The signal receiving processing and display means 300, more particularly the microprocessor 330 evaluates each digital signal being received to determine the position of the monitoring and tracking means 300 on the golf course and, using position information stored in the memory 302, determines if the monitoring and tracking means 300 is at a position that corresponds to the known locations of a start area, an end area or an intermediate travel position 16a–c. In one embodiment, each intermediate travel position 16c is preferably located to correspond with the point on the golf course where play for one hole is considered to have ended and play for the next hole is considered started. In another embodiment, intermediate positions 16c are located, in conjunction with the designated start and end areas 16a–b, so each hole or course segment is defined by its own starting and ending points for purposes of time of play (i.e., each hole or segment has a unique starting and stopping point for tracking/monitoring). For pulse-group modulated signals, the digital signal is evaluated to determine the source of the signal (e.g., a warning area 50a or a start area 16a), preferably a specified identity for the signal source (e.g., warning 50a for the fourth hole green). It is within the scope of the present invention that wherever the discussion indicates an action is taken upon entering a start area, an end area, or an intermediate travel position, the system or means being described is configurable so the described action is taken upon leaving as well as a combination of thereof (e.g., reset when entering, and start display updating when leaving).

The microprocessor 330 evaluates the received digital to determine if it is a digital signal from a start area antenna 18a (FIG. 1), step 404. If a start area signal is detected (YES), then the microprocessor 330 outputs a control signal(s) to initialize the play time clock 338 and the display means 306 and to select the appropriate time interval from the memory for the course segment that begins with the start area, step 401. The microprocessor 330 also outputs a control signal to start the play time clock 338, step 403. If the golf course is defined by multiple start areas, then the play time clock 338 is preferably initialized only upon the first entry into a start area and subsequent entries into start areas cause the play time clock 338 to be started/re-started.

In this way, the play time clock 338 is configured as an elapsed timer that continues to run until it is determined that the signal receiving processing and display means 300 is located in a designated stop area 16b, as discussed hereinafter. As noted above, the microprocessor 330 outputs a signal to the message/information display means 300 that is representative of the playtime that should be initially displayed to the golfer. Alternatively, the microprocessor 330 includes a program or algorithm that tracks elapsed time which program or algorithm is clocked by the microprocessor's internal clocking circuitry or by means of external clocking signals from the play time clock 338.

The elapsed time interval selected is that specified for that segment of the course beginning with the start area intruded. For pulse-group modulated digital signals, the specific identity of the intruded start area is defined by the digital signal; as such, the microprocessor 330 retrieves the predetermined time interval specified for the identified digital signal from the memory 332.

If the message/information display means 350 is configured so the time of play 524 being displayed is a count-down type of time display, then the microprocessor 330 causes the retrieved time interval to be initially displayed. If, however, the message/information display means 350 is configured so the time of play 524 being displayed is a count-up type of time display, then the time of play 524 being displayed is initialized to zero. For example, if it is determined that the start area contiguous the first hole is being entered, then a signal is sent to the message/information display means 350 that is representative of the predetermined time of play interval for the first hole. Thereafter, the play time clock 338 output signals are used to update the time being displayed (e.g., decrement the time display for a count-down display) for either the count-up or count-down display formats. For a count-down type of display, when the time being displayed reaches zero, the updating of the time being displayed is either stopped or the display means 285 is configured so a negative time is thereafter displayed and that time is incremented (e.g., an increasing negative time is displayed).

The microprocessor 330 or the play time clock 338 is thereafter used to update the time of play 524 in the manner required by the kind of time display (e.g., time increases for a count up display), step 405. While the display updating process continues, the process returns to monitoring the transmission frequency or transmission bandpass, step 402, for further digital signals.

While monitoring the bandpass for additional signals (step 402), the microprocessor 330 periodically determines if the time that has elapsed since the start area was entered exceeds the retrieved predetermined time interval, step 407. If the time interval is not exceeded (NO), then the microprocessor 330 continues to make such a determination.

If it is determined that the retrieved time interval is exceeded (YES), then the microprocessor 330 outputs a control signal(s) to actuate alarms and/or to display pre-scripted messages, step 409. The alarm is generated to provided an aural and/or visual que to the golfer(s) and the pre-scripted message provides a visual message to the golfer(s) advising of slow play. The alarm is also a means to get a golfer's or golf cart operator's attention so the pre-scripted message being displayed is read. For example, the visual and auditory alarms 352, 354 of the display means 306 are actuated and the message and information display 350 is configured to display a slow play warning message in response to the control signals from the microprocessor 330. The process then returns to monitoring the bandpass for digital signals, step 402.

As explained below, the microprocessor 330 is configured so the visual/auditory alarms and slow-play pre-scripted message being displayed are terminated responsive to the receipt of a digital signal that is representative of the golf cart/golfers moving onto the next segment of the course (e.g., the next hole). In another embodiment, the microprocessor 330 is configured so the auditory and/or visual alarms 352,354 are terminated in response to a signal from the local reset 342. However, for this embodiment the pre-scripted message is preferably not terminated by the local reset 342.

The alarms remain actuated, unless reset, and the pre-scripted message remains displayed until, a digital signal is received indicating that the golf cart/golfers have moved onto the next segment (e.g., next hole of the course) of the course as specified by the course representatives. If a start area signal is not detected (NO), step 404, and where the course is defined by intermediate travel or play positions 16c, the microprocessor 330 determines if the received digital signal is a signal from an intermediate travel/play position, step 406. This digital signal is representative of the completion of one segment of the course and the starting of the next segment.

Each time an intermediate position signal is detected (YES), then the microprocessor 330 determines if the specified playtime time interval for the prior hole (e.g., the hole contiguous the start area 16a) was exceeded, step 411a. If auditory and/or visual alarms were actuated and/or a pre-scripted message was being displayed (YES), then a control signal(s) is outputted by the microprocessor 330 to turn off the alarms and any slow play related pre-scripted message, step 413a.

If the prior hole time interval was not exceeded (NO), then the microprocessor 330 outputs a control signal(s) that stops updating of the time of play being displayed and stops the tracking of elapsed time for the segment that was just completed, step 415a. The microprocessor also causes information sought by course representatives to be written to the memory 332, step 417a. Preferably, the time taken to play the prior segment, and if known, the identity of the finished segment is written to the memory 332. For example, the memory 332 would contain an entry regarding slow play that indicated the golfer(s) took 30 minutes to play the first hole. Such information can be used by course representatives to optimize start or tee-off times as well as holding a golfer accountable later, if necessary.

The microprocessor 330 determines the identity of the next segment of the course and retrieves the time interval specified for playing this segment from the memory 332, and re-initializes the message/information display means 350, step 419. The message/information display means 350 is re-initialized in the fashion described above for the receipt of a start area signal (step 401). After, the display is re-initialized, the microprocessor 330 begins to track the time to play or the amount of time that has elapsed for playing the next segment, step 421.

Thereafter, the microprocessor 330 using clocking signals updates the time of play being displayed 524 in the manner required by the kind of time display (e.g., time increases for a count up display), step 405. While updating the time being displayed 524, the microprocessor 330 and the process returns to monitoring the bandpass, step 402, for further digital signals.

Similar to the discussion above concerning the start area, the microprocessor 330 periodically determines if the amount of time that has elapsed, since starting to play the next hole, exceeds the predetermined time interval specified for that hole. If the time interval is not exceeded (NO), then the microprocessor 330 continues to make such a determination, however, if the retrieved time interval is exceeded (YES), then the microprocessor 330 outputs a control signal(s) to actuate alarms and/or to display pre-scripted messages, step 409. Reference should be made to the discussion above regarding the start area 16a concerning actuation and termination of the auditory/visual alarms and displays of pre-scripted message. In this case, however, termination of the actuated alarms and message is caused when the signal receiving processing and display means 300 is determined to have entered the intermediate travel position 16c for the following hole and/or segment of the course.

In another embodiment, as indicated above, the intermediate positions 16c are located in conjunction with the designated start and end areas 16a–b so that each hole or course segment is defined with its own unique starting and ending points for purposes of time of play. For this embodiment, each time it is determined that the signal receiving processing and display means 300 is in the intermediate travel position that defines an ending point for a hole or course segment, other than that defined by the designated end area 16b, then the microprocessor 330 outputs a control signal(s) to re-initialize the displays, to re-initialize its internal memory concerning the elapsed time being tracked for each hole or course segment, and to output a signal that is representative of the playtime to be initially displayed for the next hole to be played (e.g., zero for count-up displays).

If it is determined that the signal receiving processing and display means 300 is in the intermediate travel position representative of a hole's starting point, other than that defined by the designated start area 16a, then a control signal(s) is outputted that starts the monitoring and tracking process for the next hole. Specifically, the control signal(s) outputted starts the updating of the time being displayed and starts the evaluation process to determine if the actual elapsed time exceeds the time of play interval specified for the next hole to start. Reference should also be made to the above discussions concerning actuation and termination of the auditory/visual alarms and prescripted message displays when the time interval is exceeded.

In yet another embodiment, one or more preset time warning time intervals are specified and the microprocessor 330 evaluates the time taken to play each hole to determine if one of the specified warning time intervals is met or exceeded. These warning time intervals provide an indication to the golfer(s) that a pre-specified amount of time has elapsed since starting to play a hole and/or that a pre-specified amount of time remains before the specified time of play interval for completing a hole will expire. The time intervals(s) are determined by the course representatives for the particular applications and different time intervals can be specified for different holes or segments. For example, the warning time interval may be defined to indicate that 15 minutes has elapsed since starting a hole or it may be defined to indicate that there is 5 or 2 minutes remaining before the play at a hole should be completed.

If it is determined that the warning time interval is exceed, lapsed or met, then the microprocessor 330 outputs a control signal(s) preferably causing an auditory/visual alarm to provide a short auditory signal (e.g., a chirping type of sound) to indicate a time interval warning. As noted above, the auditory signal should also cause the golfer to look at the message/information display means 350 for example to see the updated time of play being displayed.

The above actions relative to the intermediate travel positions 16c, and time warning signals are repeated until the signal receiving processing and display means 300, is determined to be in an end area 16b. If a start area signal is not detected (NO-step 404) and an intermediate position signal is not detected (NO-step 406) the microprocessor 330 determines if the digital signal being received is a signal from a stop or end area 16b, step 408. This digital signal is representative of the completion of a game (e.g., 18 holes) or a completion of a part of the game (e.g., front 9 holes).

Similar to that done for intermediate are signals, if a stop area signal is detected (YES), then the microprocessor 330 determines if the specified playtime time interval for the prior hole was exceeded, step 411b. If the time was exceeded (YES), then a control signal(s) is outputted by the microprocessor 330 to turn off the alarms and any slow play related pre-scripted message, step 413b. If the prior hole time interval was not exceeded (NO), then the microprocessor 330 outputs a control signal(s) that stops updating of the time of play being displayed and stops the tracking of elapsed time for the segment that was just completed, step 415a. The microprocessor also causes information sought by course representatives to be written to the memory 332, step 417a. Reference should also be made to the discussion above regarding steps 411a, 413a, 415a, 417a for further details. For a stop area 16c, the control signal(s) outputted to write information to the memory 332 also causes the time from the play time clock 338, the time taken to play the last hole or segment, and the identifier for the last hole to be written to the memory 332. The information in the memory 332 may be accessed later by course representatives using an information display 310 or other devices/apparatuses known in the art (e.g., microprocessor). In this way, the signal receiving processing and display means 300 can be used again and again.

Figure 5B:
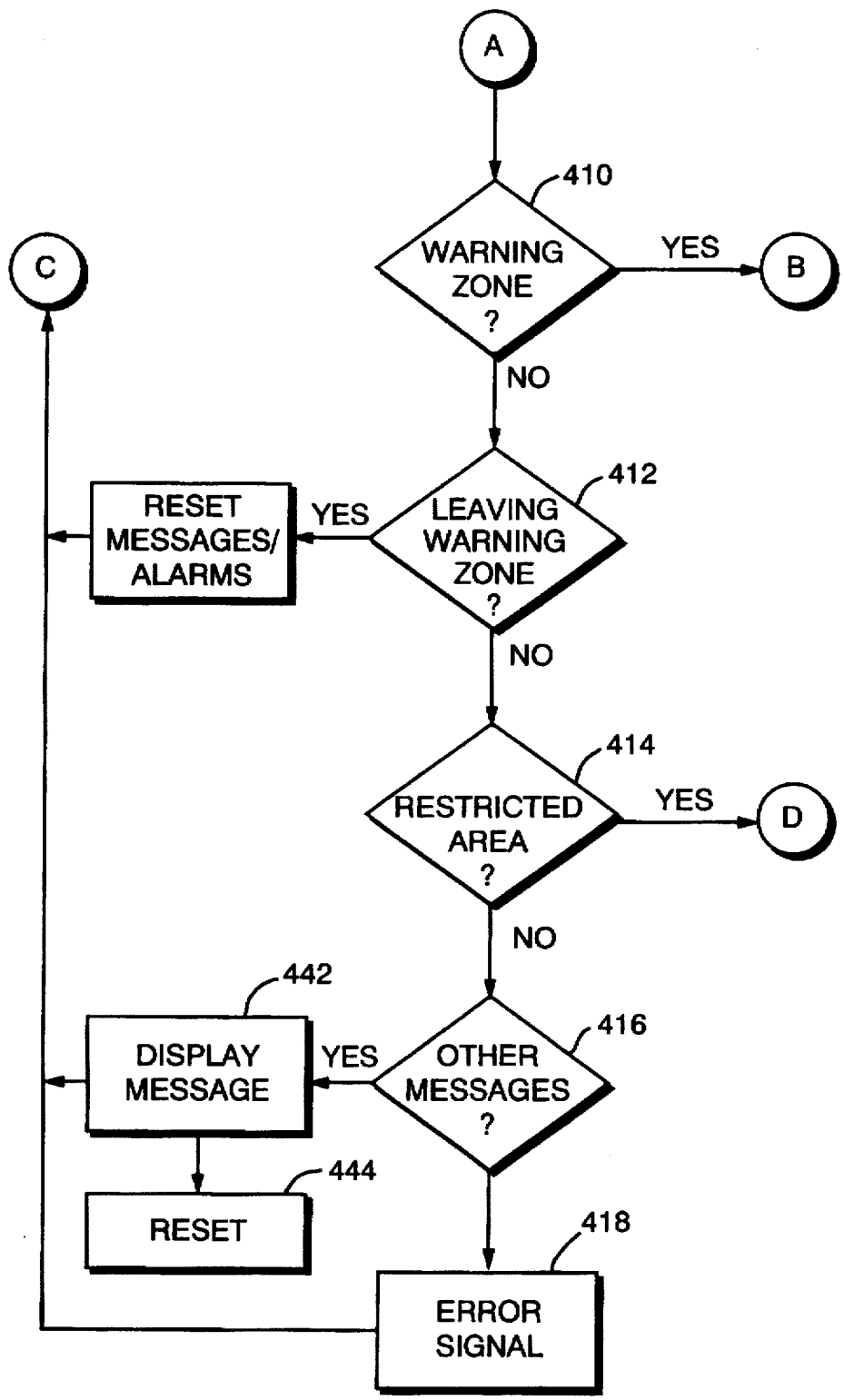
Figure 5C:
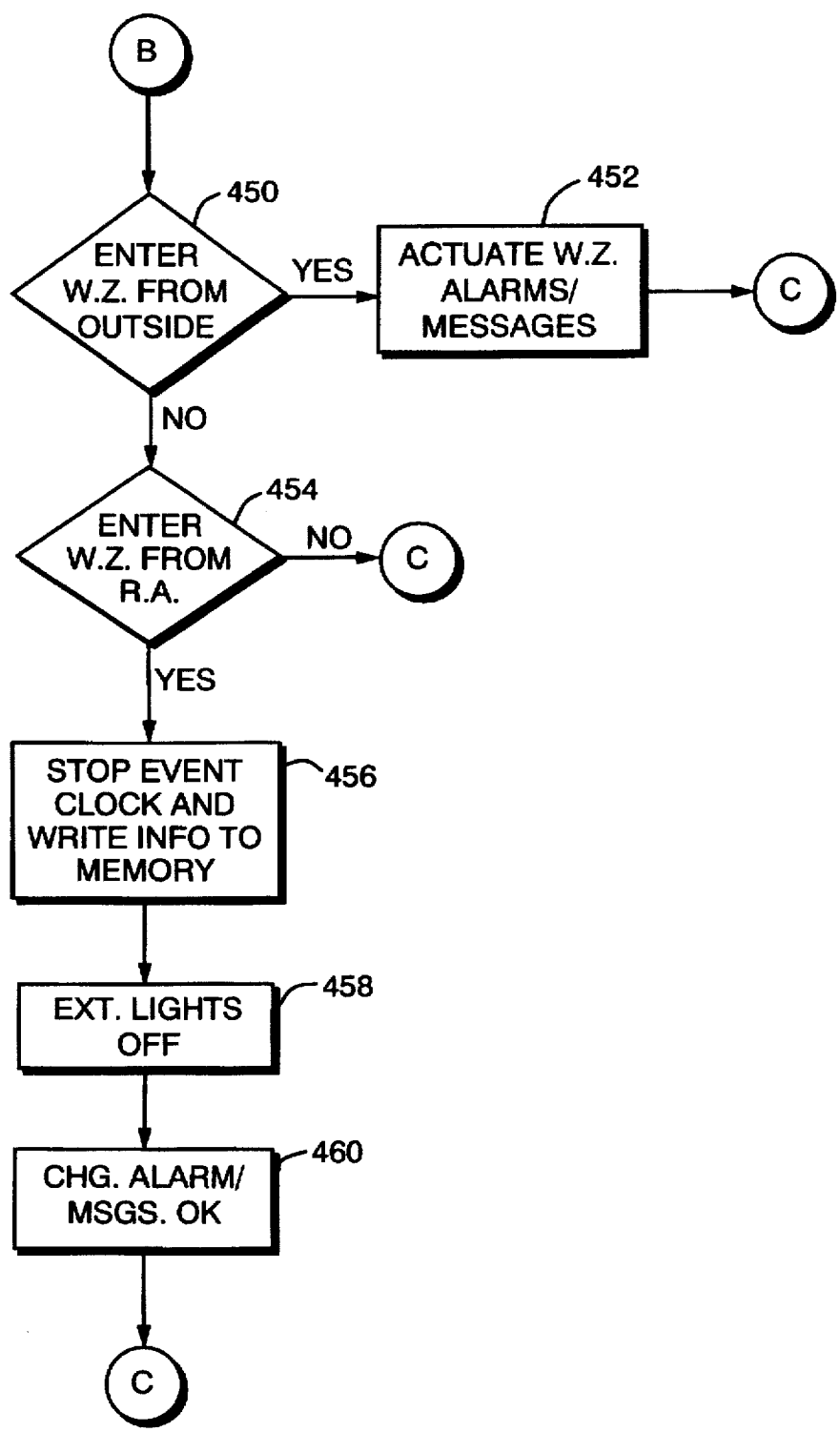
Figure 5D:
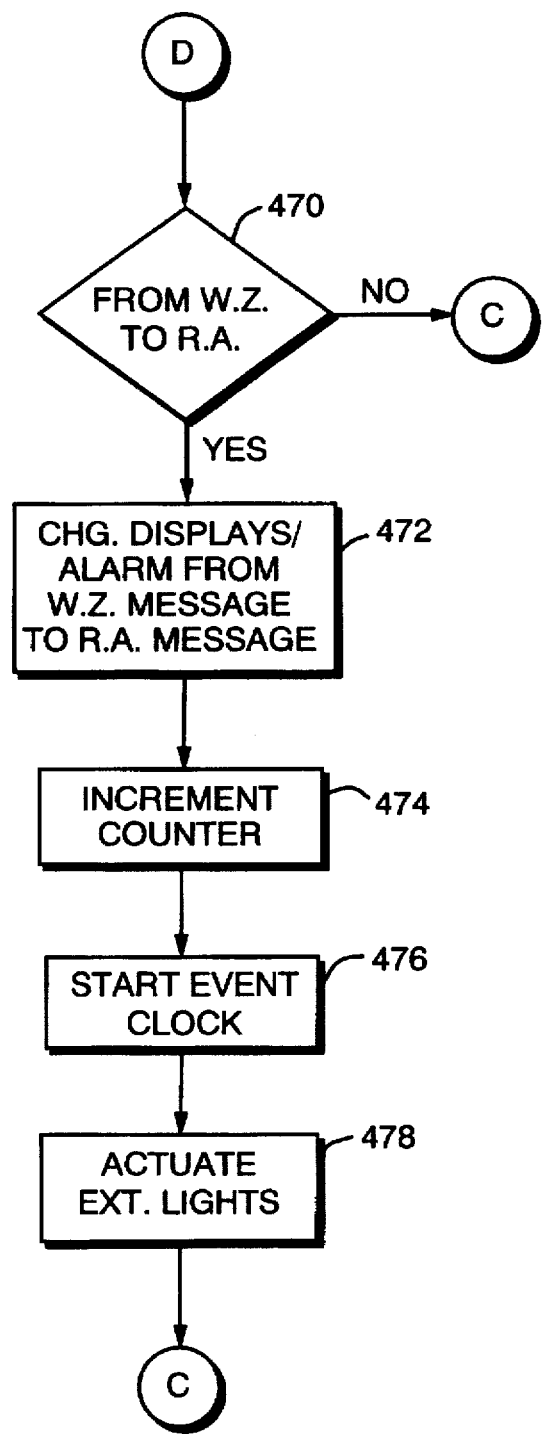
Figure 6A:
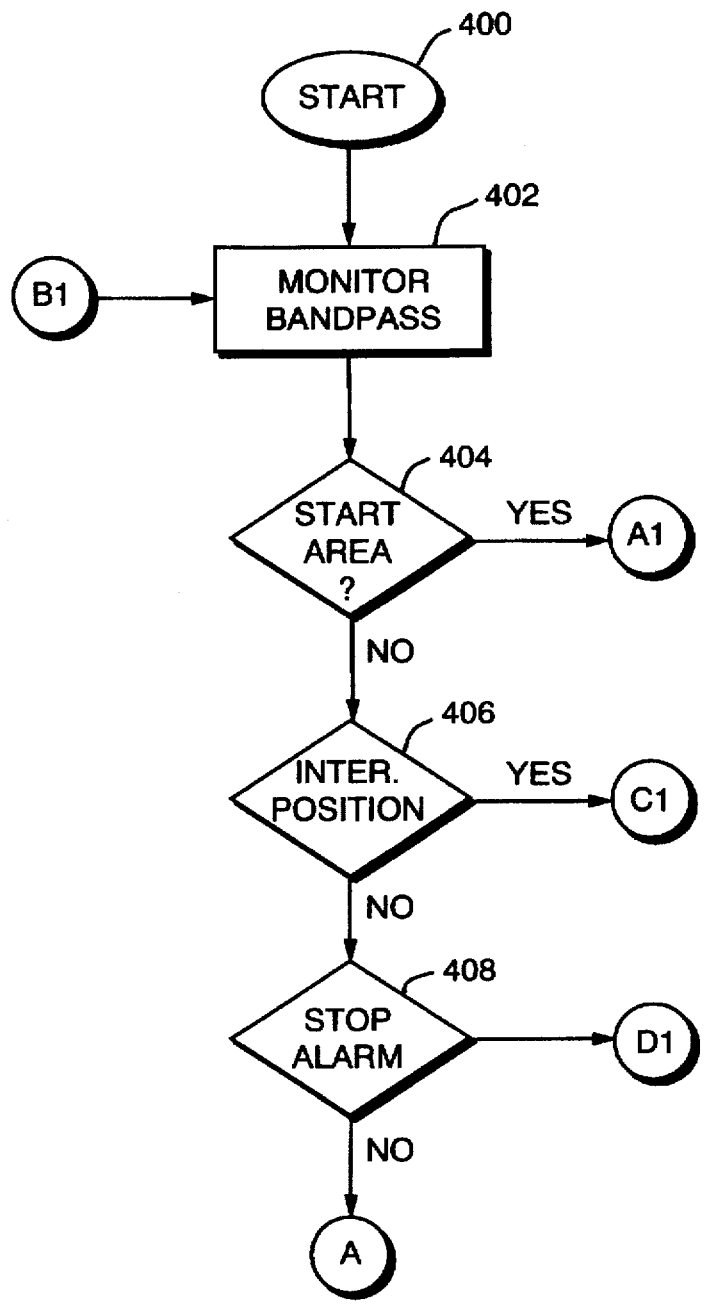
FIGS. 6A–D is an alternate embodiment to the methodology of FIG. 5A.
Figure 6B:
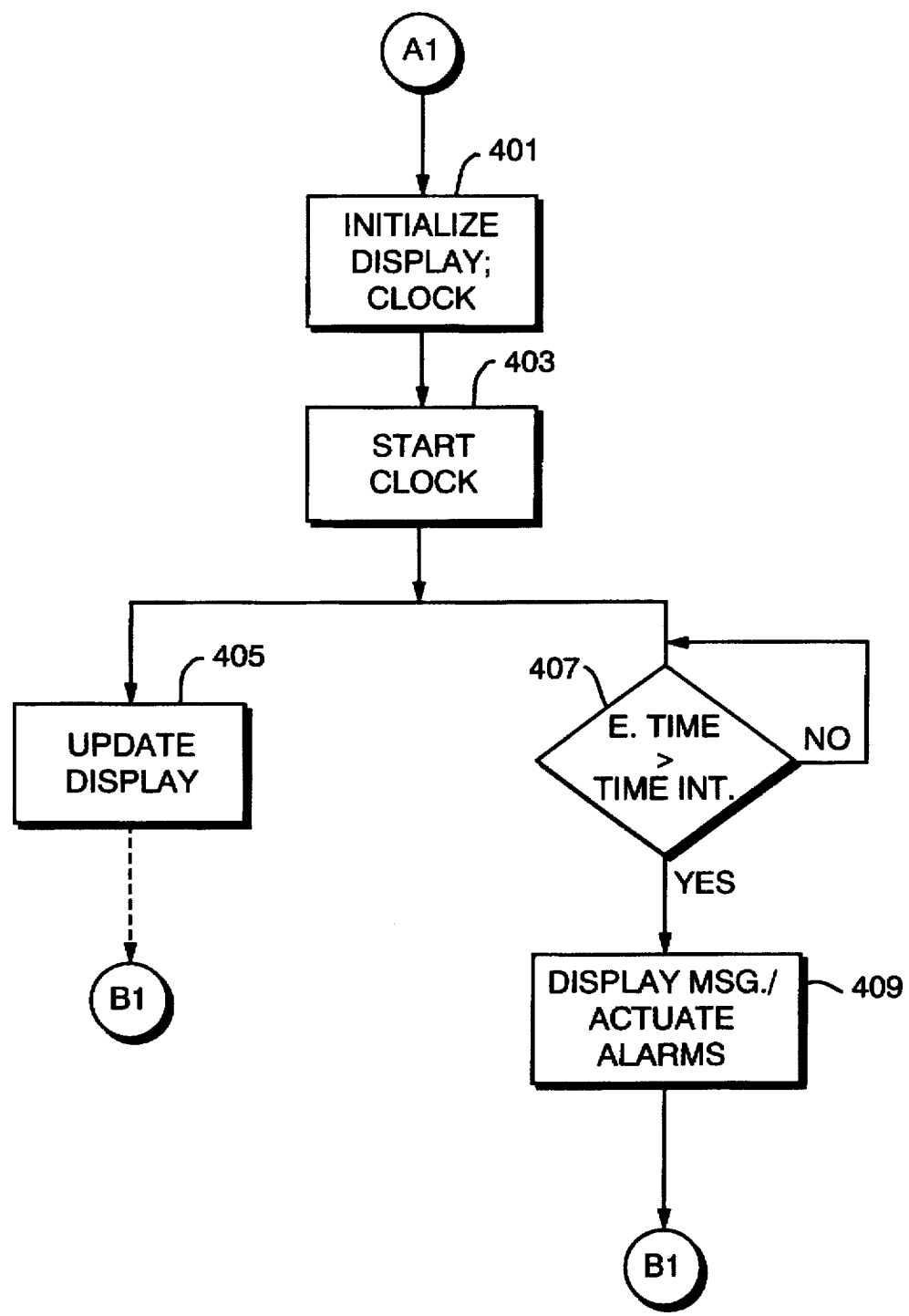
Figure 6C:
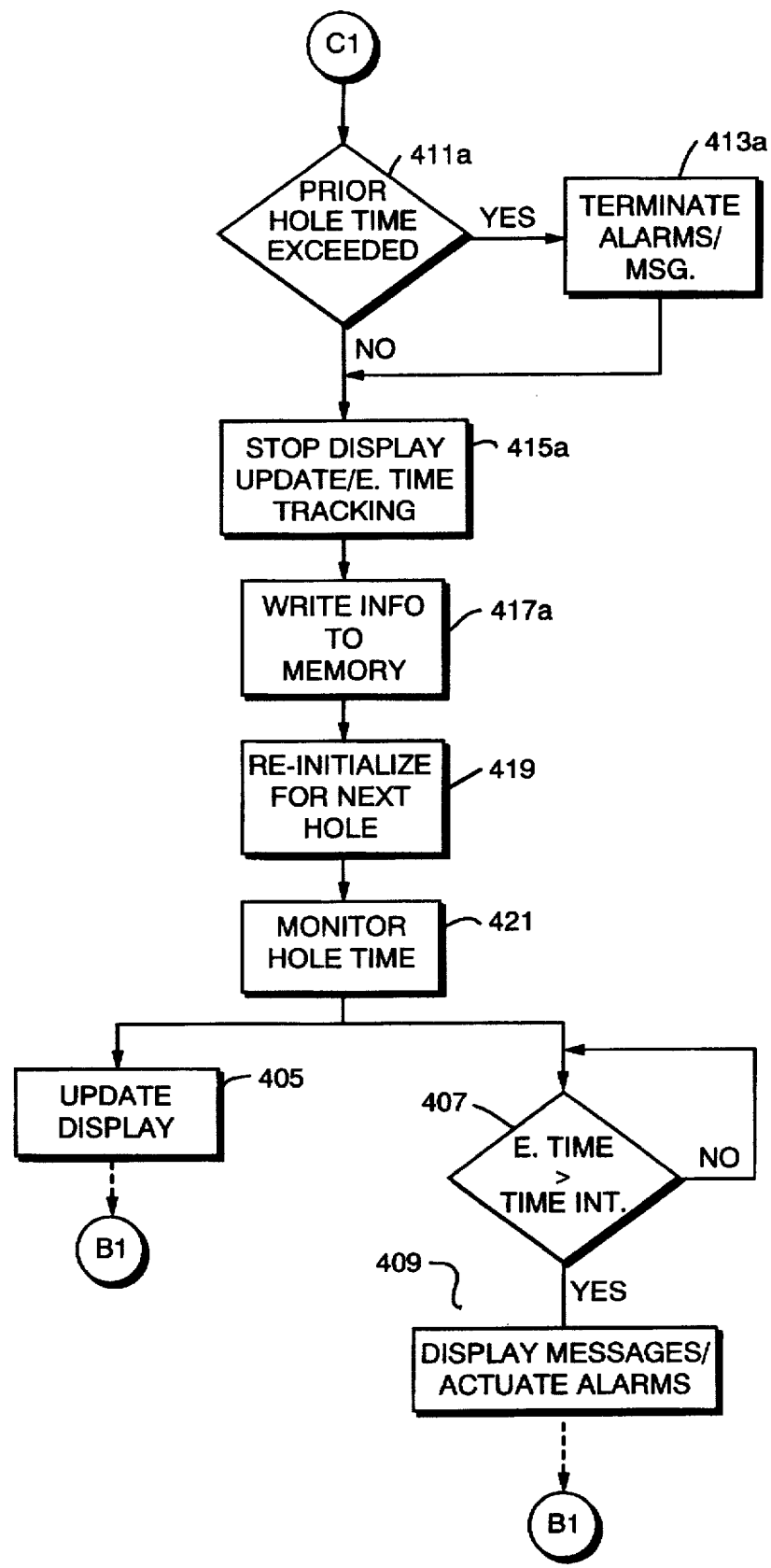
Figure 6D:
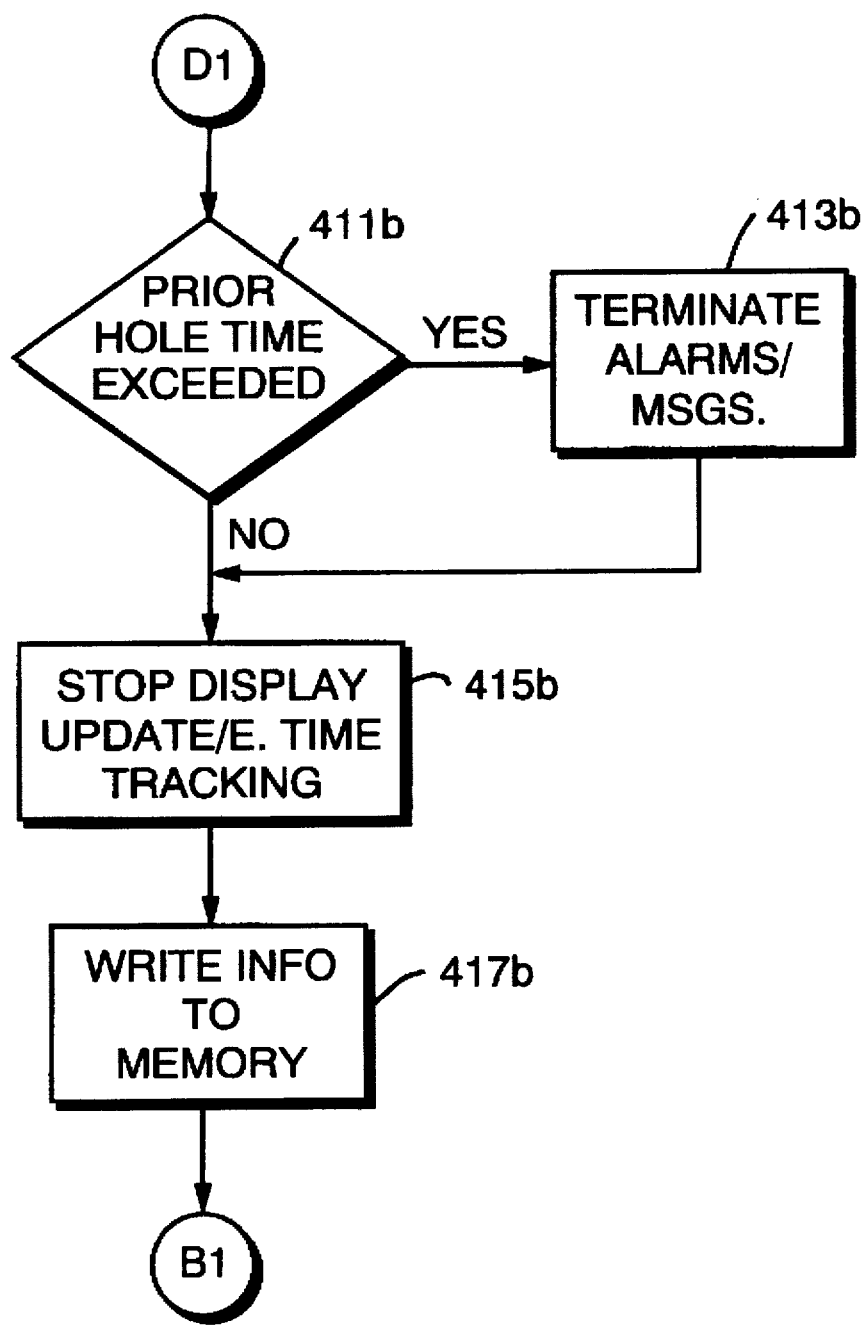

If a start area signal is not being detected (NO), step 404, nor an intermediate position signal (NO), step 406, nor a stop area signal (NO), step 406, then the process continues on to the methodology as set forth on FIGS. 5B-D. However for this embodiment, when FIGS. 5B-D indicate that the process returns back to FIG. 5A it should be understood that the process is returning to the corresponding step of FIG. 6A.

Figure 7A:
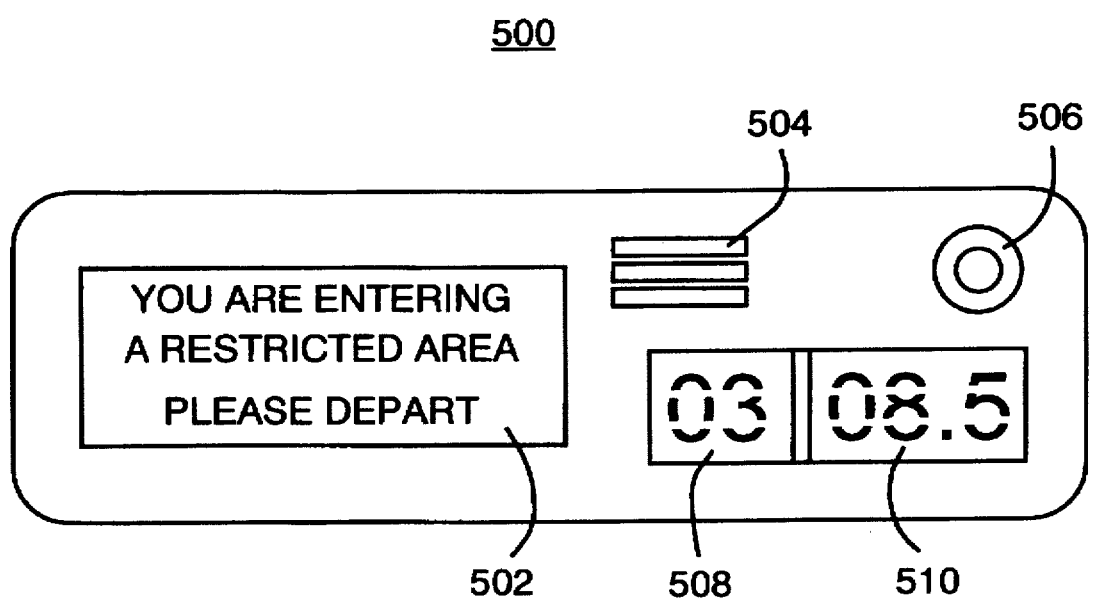
FIGS. 7A, B are elevation views of two information displays for the signal receiving, processing and display means.

There is shown in FIG. 7A an elevation view of one embodiment of an information display 500 of the signal receiving, processing and display means 22,300 on a golf cart 14 (FIG. 1). The information display 500 includes a message display 502 that contains at least one pre-scripted message such as "YOU ARE ENTERING A RESTRICTED AREA-PLEASE DEPART" for display. Preferably, the message display 502 is uniquely illuminated (e.g., by different colored lights) depending upon the location of the golf cart 14 with respect to the first and second alert zones 50a,b (FIGS. 2A-C). For example, when the golf cart 14 is located in the first alert zone 50a the message display 502 is illuminated by a yellow light and when in the second alert zone 50b the message display 502 is illuminated with a red light. In this way, an operator receives both the visual alarm or warning and the pre-scripted message.

Alternatively, the message display 502, contains two prescripted messages. The first message is "YOU ARE ENTERING A RESTRICTED AREA-PLEASE DEPART" and the second is "YOU ARE IN A RESTRICTED AREA-DEPART AT ONCE." In this embodiment, the messages are uniquely illuminated corresponding with the location of the cart (e.g., first message is illuminated with a yellow light). In this way, an operator is provided with a unique visual alarm and a unique informative pre-scripted message for each of the alert zones.

The information display 500 contains a two digit event counter display 508 that indicates the number of times a golf cart has entered into restricted areas (i.e., second alert zone) during a game. The information display 500 also contains a three digit time display 510 that indicates the total amount of time a cart has been located in restricted areas during a game. In the illustrated example, a cart has entered restricted areas three times and has been in these areas for a total of 8.5 minutes. While two and three digit displays are illustrated, this is not a limitation as the displays may have more or less digits as the actual needs may require.

A plurality of slit apertures 504 is provided in the information display 500, to permit the passage of the auditory signal from the auditory alarm 352. The information display 500 also includes a lockable switch 506, as is known in the art, for use by course representatives to manually reset the signal processing means 304 and the display means 306 as well as shutting off the external visual alarm 308 as explained above in conjunction with FIG. 4. In this way, a course representative can reset a cart's signal receiving, processing and display means 22,300 so the golf cart 114 can be used by another operator and so the information being displayed in the event counter display 508 and the time display 510 reflects the use of the cart 14.

Figure 7B:
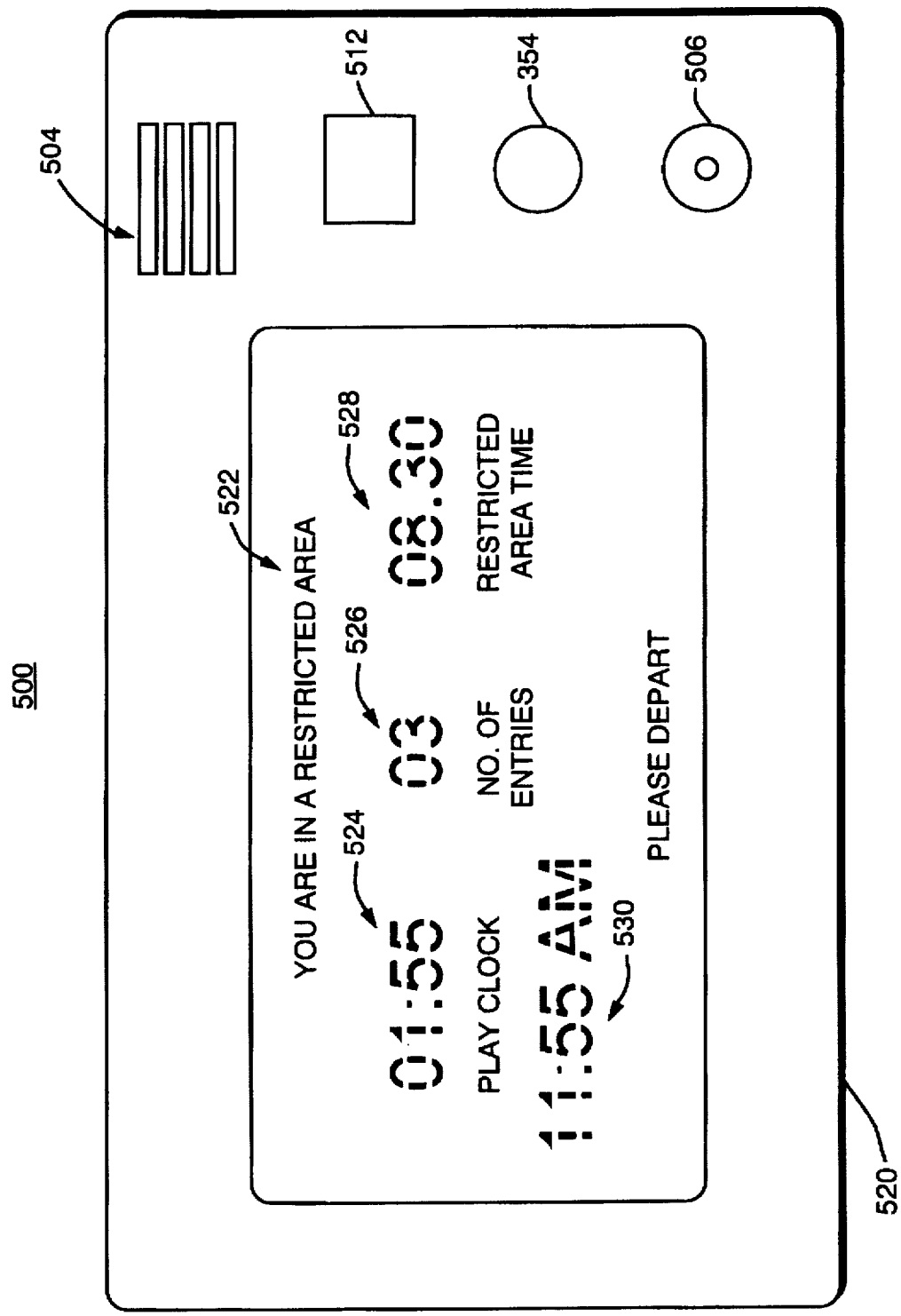

It should be recognized that it is well within the skill of those in the art to adapt other types of displays for use in the subject invention. In another embodiment of the message/information display 500, FIG. 7B, a liquid crystal display (LCD) 520 is used to display pre-scripted messages 522 and other information such as time of play 524, the time of day 530 as well as the event time 528 and the number of events 526 associated with a cart being operated in restricted areas. The message/information display 500 includes a visual alarm 354 and aperture slits 504 for the auditory alarm 352. As indicated above in the discussion of FIGS. 5A-D and FIGS. 6A-D, the auditory and visual alarms 352,354 in addition to providing a visual and/or aural cues to identify the cart's position with respect to a restricted area, also draw the attention of the operator to the LCD displayed information/messages.

As discussed above, the time of play 524 being displayed is a count-up or count-down type of display. In one embodiment, when configured as a count-down type of display, the time initially displayed is that specified by course representatives as being the time that should be taken to play a given segment of the course. When the time that has elapsed exceeds that initially displayed, the time of play 524 being displayed is a negative increasing time. Additionally, a pre-scripted message is displayed advising of slow play as well as visual and/or auditory alarms being actuated. Auditory and/or visual alarms are actuated to provide an advance warning to golfers that the specified time interval for a given course segment is about to expire or run out.

In an alternate embodiment, the LCD display 520 is configured so only the pre-scripted messages are displayed to the cart operator and the displays for event time 526 and for event counts 528 are normally suppressed. This information is displayed if and when the golf cart 14 enters into a second alert zone 50b. In this embodiment, the displays of event time and the event counts 526,528 are also displayed if actuated by the course representatives (i.e., when they want to obtain this information). In this way, a cart operator is not continuously reminded by the LCD message display 520 of intrusions into restricted areas or second alert zones 50b throughout play. However, the event log information is available to course representatives to determine if further action is warranted.

If the digital signals being transmitted are pulse group modulated, the information being accumulated and stored in the memory 332 includes the identity of the prespecified feature (e.g., green for first hole). As such, when course representatives retrieve information relative to restricted area intrusions, the information being retrieved identifies the specific restricted area intruded as well as how long the golf cart 14 was located in that restricted area (e.g., cart was located in green restricted area of first hole for 10 minutes). In another embodiment, the LCD display 520 is configured to replay this information when accessed by course representatives.

In yet another embodiment, the LCD display 520 is configured to display the pre-scripted messages, unrelated to determined cart position, when the microprocessor 330 determines that the received digital signal is one of the pre-scripted message digital signals. Since the LCD display 520 is not automatically cleared of these pre-scripted messages, nor are the associated visual alarm 354 and/or auditory alarm 352 actuated to draw the cart operator's attention to the LCD display 520, the information display 500 includes a local reset 512 (e.g., button or switch). By actuating the local reset 512, a cart operator clears the message being displayed on the LCD display 520 as well as turning off any auditory and visual alarms 352,354 actuated concurrent with the display of the pre-scripted message.

Figure 8:
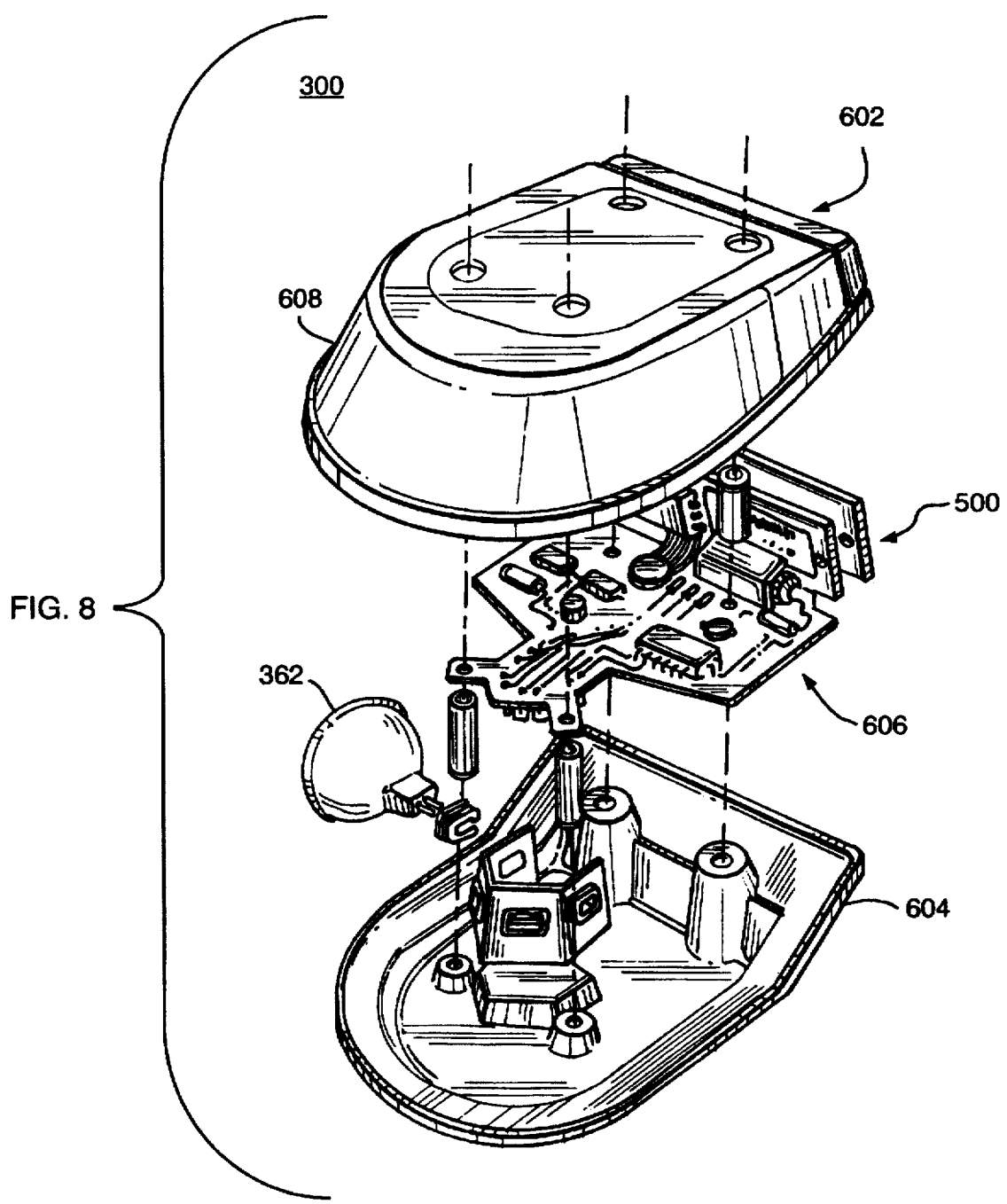
FIG. 8 is an exploded axonometric view of the signal receiving, processing and display means and its associated housing.

An exploded view of the signal receiving processing and display means 22,300, including the associated housing, is shown in FIG. 8. The signal processing and display means 22,300 includes an information display 500, top and bottom housing sections 602,604, a plurality of external visual alarm lights 362 although only one light is illustrated, and an electronics package 606 containing the circuits, microprocessor 330 and memory 332 described above in connection with FIGS. 4, 5A-D.

The external visual alarm lights 362 are disposed opposite the information display 500 so that these lights are not visible to the cart operator when driving the cart 14. When the top and bottom housing sections 602,604 are secured together, the light from the external visual alarm lights 362 shine through a clear portion 608 of the top housing 602 so a course ranger or representative can see the external visual alarm lights 362 when the external visual alarm 308 is activated. In this way the course ranger or representative can readily identify carts located within restricted areas.

While a preferred embodiment of the invention has been described using specific terms, such description is for illustrative purposes only, and it is to be understood that changes and variations may be made without departing from the spirit or scope of the following claims.

What is claimed is:

1. A golf cart control and monitoring system, comprising:
   transmitting means for generating a plurality of digital signals, said transmitting means being disposed proximate each prespecified feature of a golf course;
   receiving and processing means, disposed on the golf cart, for receiving and processing the digital signals from said transmitting means to determine said receiving and processing means position with respect to the course prespecified feature and for providing a control signal that is representative of the position of said receiving and processing means; and
   event log means, responsive to the receiving and processing means control signals representative of the position of said receiving and processing means, for generating a historical log of how many times said receiving and processing means is determined to be located within golf course restricted areas.

2. The golf cart control and monitoring system of claim 1, wherein said event log means is adapted to generate a historical log of how long said receiving and processing means is determined to be located in golf course restricted areas.

3. The golf cart control and monitoring system of claim 2, wherein said event log includes:
   an event counter, responsive to the receiving and processing means control signals representative of the position of said receiving and control means, for counting each time said receiving and control means is determined to have entered into restricted areas; and
   time accumulation means, responsive to the receiving and processing means control signals representative of the position of said receiving and control means, for determining at least the cumulative amount of time that said receiving and processing means is determined to be located in restricted areas.

4. The golf cart control and monitoring system of claim 3, in which said event log means further includes:
   an event display, responsive to said event counter, that provides a visual display to an operator of the golf cart of the total number of entries into restricted areas; and
   a time display, responsive to said time accumulation means, that provides a visual display to the golf cart operator of the cumulative time.

5. The golf cart control and monitoring system of claim 2, wherein said receiving and processing means generates a first control signal when said receiving and processing means is determined to be approaching the restricted area and generates a second signal when said receiving and processing means is determined to be in the restricted area, and wherein said event log means begins to accumulate data upon receipt of the second control signal and terminates data accumulation at least when said second signal is terminated.

6. The golf cart control and monitoring system of claim 4, wherein said first signal is generated when said receiving and processing means is determined to be in a warning zone indicating that said receiving and processing means is approaching the restricted area.

7. The golf cart control and monitoring system of claim 5, wherein said receiving and processing means outputs a third control signal when said receiving and processing means is determined to be located in a designated start area of the golf course and outputs a fourth control signal when said receiving and processing means is determined to be located in a designated end area of the golf course; and wherein said receiving and processing means includes:
   a playtime clock that is started responsive to the third control signal and stopped responsive to the fourth control signal;
   a memory for storing data and information;
   means, responsive to the fourth control signal for storing in said memory the time reflected on said playtime clock when stopped; and
   playtime display means, responsive to output signals from said playtime clock, for displaying the time which has elapsed since said playtime clock was started.

8. The golf cart control and monitoring system of claim 7, wherein said receiving and processing means outputs a fifth control signal when said receiving and processing means is determined to be located in a designated intermediate travel position of the golf course and wherein the time reflected on said playtime clock is stored in said memory responsive to each fifth control signal.

9. The golf cart control and monitoring system of claim 8, wherein the digital signal being received includes information to identify the start area, the end area and the intermediate travel position, wherein said receiving and processing means determines the identity of the area, and the identity of the area is stored along with the time reflected on said playtime clock in said memory.

10. The golf cart control and monitoring system of claim 2, wherein said event log means begins to accumulate data when it is determined that said receiving and processing means is located in the restricted area and terminates data accumulation when it is determined that said receiving and processing means has exited the restricted area.

11. The golf cart control and monitoring system of claim 2 further comprising a display means for displaying at least the total number of entries into restricted areas and the cumulative amount of time in the restricted areas of the course.

12. The golf cart control and monitoring system of claim 2, wherein the digital signal from said transmission means is pulse-width modulated so as to distinguish different types of signal sources.

13. The golf cart control and monitoring system of claim 2, wherein the digital signal from said transmission means is pulse-group modulated so as to distinguish and identify each transmission means and an associated prespecified feature.

14. The golf cart control and monitoring system of claim 2, wherein the digital signal from said transmitting means is encoded with information to identify the pre-specified feature proximate said transmitting means and wherein said receiving and processing means includes means for decoding each signal to determine the pre-specified feature.

15. The golf cart control and monitoring system of claim 2, wherein said transmitting means includes at least one antenna, each said at least one antenna being disposed proximate each of said prespecified features.

16. The golf cart control and monitoring system of claim 15, wherein said receiving and processing means determines the position of said receiving and processing means with respect to said antenna and outputs a first control signal when said receiving and processing means is determined to be a first distance from said antenna, representative of said receiving and control means being in the restricted area.

17. The golf cart control and monitoring system of claim 16, wherein said receiving and processing means outputs a second control signal when said receiving and processing means is determined to be at least within a second distance from said antenna, representative of said receiving and control means approaching the restricted area.

18. The golf cart control and monitoring system of claim 17, wherein said receiving and processing means further includes means for determining the signal strength of each said signal radiating from each antenna, wherein said first control signal is outputted when a first pre-specified signal strength value is exceeded and wherein said second control signal is outputted when a second pre-specified signal strength value is exceeded.

19. The golf cart control and monitoring system of claim 15, wherein each of said antennas is disposed below grade.

20. The golf cart control and monitoring system of claim 2, wherein said transmitting means includes at least first and second antennas spaced from each other and being disposed proximate each prespecified feature of a golf course, said first antenna being disposed outside of said second antenna and each of said antennas transmitting digital signals.

21. The golf cart control and monitoring system of claim 20, wherein said receiving and processing means determines the position of said receiving and processing means with respect to said first and second antennas and outputs a first control signal when said receiving and processing means is determined to be a prespecified distance from said second antenna, representative of said receiving and control means being in the restricted area.

22. The golf cart control and monitoring system of claim 21, wherein said receiving and processing means outputs a second control signal when said receiving and processing means is determined to be at least within a prespecified distance from said first antenna, representative of said receiving and control means approaching the restricted area.

23. The golf cart control and monitoring system of claim 22, wherein said receiving and processing means further includes means for determining the signal strength of each signal radiating from each of said antennas, wherein said first control signal, representative of said receiving and processing means being in a restricted area, is outputted when a first pre-specified signal strength value is exceeded and wherein said second control signal, of representative of said receiving and control means approaching the restricted area, is outputted when a second pre-specified signal strength value is exceeded.

24. The golf cart control and monitoring system of claim 22, wherein said transmitting means further includes at least two transmitters, one transmitter for each of said antennas.

25. The golf cart control and monitoring system of claim 24, wherein each said transmitter transmits digital signals at a same frequency and wherein said receiving and processing means includes a receiver for receiving the digital signals being transmitted.

26. The golf cart control and monitoring system of claim 25, wherein each said transmitter is configured so the digital signals are transmitted asynchronously.

27. The golf cart control and monitoring system of claim 26, wherein said receiving and processing means further includes:

an event clock that is started each time said receiving and processing means is determined to be in the restricted area and stopped when said receiving and processing means is determined to be leaving the restricted area;

a memory for storing data and information;

wherein the digital signal from each said transmitter includes information to uniquely identify each restricted area on the golf course;

wherein said receiving and processing means includes means for decoding each digital signal to determine the identity of restricted area being intruded;

wherein said receiving and processing means outputs a control signal causing the time reflected on said event clock and the identity of the restricted area intruded to be stored in said memory when said receiving and processing means exits the restricted area.

28. The golf cart control and monitoring system of claim 24, wherein each said transmitter is configured to transmit digital signals at a different frequency from other transmitters and wherein said receiving and processing means includes a receiver for each transmission frequency.

29. The golf cart control and monitoring system of claim 24, wherein the digital signal from each said transmitter includes information to identify at least which of said first and second antennas the signal is being radiated from and wherein said receiving and processing means includes means for decoding each signal to determine the information included in the signal being received.

30. The golf cart control and monitoring apparatus of claim 24, wherein said transmission means includes a lightning protection device interconnected each transmitter and each antenna to protect the interconnected transmitter and antenna from the effects of lightning strikes.

31. The golf cart control and monitoring system of claim 20, wherein each of said antennas is disposed below grade.

32. The golf cart control and monitoring system of claim 1, wherein said transmission means includes microprocessing means for determining when to transmit the digital signal from said transmission means and for determining the digital signal to be transmitted.

33. The golf cart control and monitoring system of claim 32, wherein said transmission means includes a plurality of antennas and said microprocessing means determines when to transmit the digital signal from each antenna and the digital signal to be transmitted from each antenna.

34. The golf cart control and monitoring system of claim 33, wherein said transmission means includes a plurality of signal generating means for generating the signal to be transmitted at a specified power output, where there is one signal generating means for each antenna.

35. The golf cart control and monitoring system of claim 34, wherein said transmission means includes a power supply and means, responsive to said microprocessing means for enabling the selective interconnection of said power supply to a one of said signal generating means when said microprocessing means determines that the digital signal is to be transmitted from the antenna associated with the one of said generating means.

36. The golf cart control and monitoring system of claim 1, in which said system further includes an external visual warning means, disposed on the golf cart, for generating a visual signal, visible to golf course representatives at other locations on the golf course, to indicate the position of the golf cart with respect to the prespecified features on the golf course, said external visual warning means being responsive to said receiving and processing means control signals output signals, wherein said external visual warning means is activated when said receiving and processing means is determined to be located the restricted area.

37. The golf cart control and monitoring system of claim 1, in which said system further includes a display means, disposed on the golf cart, for displaying a pre-scripted message, where there is at least one pre-scripted message to be displayed that advises a golf cart operator of the cart's location with respect to the restricted area, wherein said display means further includes message determining means, responsive to said receiving and processing means control signals, for determining the prescripted message to display.

38. The golf cart control and monitoring system of claim 1, in which said system further includes a solar electrical power supply means for providing electrical power from ambient light to energize said signal transmission means, wherein said solar electrical power supply means further includes a solar power cell to generate electrical power from the ambient light incident upon said solar power cell.

39. The golf cart control and monitoring apparatus of claim 1, wherein said transmission means includes a lightning protection device that protects said transmission means from the effects of lightning strikes.

40. A golf cart control and monitoring system, comprising:
   transmitting means for generating a plurality of digital signals, said transmitting means being disposed proximate each prespecified feature of a golf course;
   receiving and processing means, disposed on the golf cart, for receiving and processing the digital signals from said transmitting means to determine said receiving and processing means position with respect to the course prespecified feature and for providing a control signal that is representative of the position of said receiving and processing means;
   wherein said receiving and processing means outputs a first control signal when said receiving and processing means is determined to be located in a designated start area of the golf course and outputs a second control signal when said receiving and processing means is determined to be located in a designated end area of the golf course; and
   a playtime clock, said playtime clock being started responsive to the first control signal and stopped responsive to said second control signal.

41. The golf cart control and monitoring system of claim 40, in which said system further includes a playtime display means, responsive to output signals from said playtime clock, for displaying the time which has elapsed since said playtime clock was started responsive to the first control signal.

42. The golf cart control and monitoring system of claim 40, wherein said receiving and processing means includes a memory that stores data and information and means, responsive to the second control signal for storing in said memory the time reflected on said playtime clock when stopped.

43. The golf cart control and monitoring system of claim 42, wherein said receiving and processing means outputs a third control signal when said receiving and processing means is determined to be located in a designated intermediate travel position of the golf course and wherein the time reflected on said playtime clock is stored in said memory responsive to the third control signal.

44. The golf cart control and monitoring system of claim 43, wherein the digital signal being received includes information to identify the start area, the end area and the intermediate travel position, wherein said receiving and processing means determines the identity of the area, and the identity of the area is stored along with the time reflected on said playtime clock in said memory.

45. The golf cart control and monitoring system of claim 43, wherein said receiving and processing means includes means for comparing the playtime clock time for each designated intermediate travel position with a specified time interval for a given designated intermediate travel position to determine if there is slow play.

46. The golf cart control and monitoring system of claim 45, further including means, responsive to said comparing means, for advising the cart operator of slow play.

47. The golf cart control and monitoring system of claim 46, wherein said advising means is re-settable by the cart operator and includes a message display that provides a prescripted message advising the cart operator of slow play and an alarm means for providing at least one type of alarm signal to at least indicate the presence of a pre-scripted message on said message display.

48. The golf cart control and monitoring system of claim 40, in which said system further includes event log means, responsive to the receiving and processing means control signals representative of the position of said receiving and processing means, for generating a historical log of how many times and how long said receiving and processing means is determined to be located within golf course restricted areas; wherein said receiving and processing means generates a fourth control signal when said receiving and processing means is determined to be approaching the restricted area and generates a fifth control signal when said receiving and processing means is determined to be in the restricted area; and wherein said event log means begins to accumulate data upon receipt of the fifth control signal and terminates data accumulation when it is determined that said receiving and processing means has exited the restricted area.

49. The golf cart control and monitoring system of claim 48, wherein said event log means includes:
   an event counter, responsive to the receiving and processing means control signals representative of the position of said receiving and control means, for counting each time said receiving and control means is determined to have entered into restricted areas;
   time accumulation means, responsive to the receiving and processing means control signals representative of the position of said receiving and control means, for determining at least the cumulative amount of time that said receiving and processing means is determined to be located in restricted areas; and an event display means for displaying the cumulative amount of time in the restricted areas of the course.

50. The golf cart control and monitoring system of claim 40, wherein said transmission means includes:

microprocessing means for determining when to transmit the digital signal from said transmission means and for determining the digital signal to be transmitted;

at least one antenna proximate each prespecified feature;

at least one signal generating means for generating the signal to be transmitted at a specified power output, where there is one signal generating means for each antenna; and wherein said microprocessing means determines when to transmit the digital signal from each antenna and the digital signal to be transmitted from each antenna.

51. The golf cart control and monitoring system of claim 50, wherein said transmission means includes a power supply and means, responsive to said microprocessing means for enabling the selective interconnection of said power supply to a one of said signal generating means when said microprocessing means determines that the digital signal is to be transmitted from the antenna associated with the one of said generating means.

52. The golf cart control and monitoring system of claim 50, wherein each of said antennas is disposed below grade.

53. The golf cart control and monitoring system of claim 40, in which said system further includes an external visual warning means, disposed on the golf cart, for generating a visual signal, visible to golf course representatives at other locations on the golf course, to indicate the position of the golf cart with respect to the prespecified features on the golf course, said external visual warning means being responsive to said receiving and processing means control signals, wherein said external visual warning means is activated when said receiving and processing means is determined to be located within the restricted area.

54. The golf cart control and monitoring system of claim in which said system further includes a display means, disposed on the golf cart, for displaying a pre-scripted message, where there is at least one pre-scripted message to be displayed that advises a golf cart operator of the cart's location with respect to the restricted area, wherein said display means further includes message determining means, responsive to said receiving and processing means control signals, for determining the prescripted message to display.

55. The golf cart control and monitoring system of claim in which said system further includes a solar electrical power supply means for providing electrical power from ambient light to energize said signal transmission means, wherein said solar electrical power supply means further includes a solar power cell to generate electrical power from the ambient light incident upon said solar power cell.

56. The golf cart control and monitoring system of claim wherein said transmission means includes a lightning protection device that protects said transmission means from the effects of lightning strikes.

57. A golf cart control and monitoring system, comprising:

transmitting means for generating a plurality of digital signals, said transmitting means being disposed proximate each prespecified feature of a golf course;

receiving and processing means, disposed on the golf cart, for receiving and processing the digital signals from said transmitting means to determine said receiving and processing means position with respect to the course prespecified feature and for providing a control signal that is representative of the position of said receiving and processing means; and an external visual warning means, disposed on the golf cart, for generating a visual signal, visible to golf course representatives at other locations on the golf course, to indicate the position of the golf cart with respect to the prespecified features on the golf course, said external visual warning means being responsive to said receiving and processing means control signals, wherein said external visual warning means is activated when said receiving and processing means is determined to be located within the restricted area.

58. The golf cart control and monitoring system of claim 57, wherein the visual signal is terminated when said receiving and processing means is determined to be exiting the restricted area.

59. The golf cart control and monitoring system of claim 57, wherein said external visual warning means includes a plurality of lights.

60. The golf cart control and monitoring system of claim 59, wherein said external visual warning means includes a sequencer that controls the lighting of said plurality of lights.

61. The golf cart control and monitoring system of claim 60, wherein said external visual warning means further includes a plurality of switches, controlled by said sequencer, for switchably and selectively energizing each of said plurality of lights so that said lights are sequentially and repetitively lit.

62. The golf cart control and monitoring system of claim 57, wherein said receiving and processing means and said external visual warning means are contained in a single housing.

63. The golf cart control and monitoring system of claim 57, wherein said receiving and processing means outputs a first control signal when said receiving and processing means is determined to be approaching the restricted area and outputs a second control signal when said receiving and processing means is determined to be located in the restricted area and wherein said external visual alarm is actuated responsive to said second control signal.

64. The golf cart control and monitoring system of claim 63, in which said system further includes event log means, responsive to the receiving and processing means control signals representative of the position of said receiving and control means, for generating a historical log of how many times and how long said receiving and processing means is determined to be located within golf course restricted areas, and wherein said event log means begins to accumulate data upon receipt of the second control signal and terminates data accumulation when it is determined that said receiving and processing means has exited the restricted area.

65. The golf cart control and monitoring system of claim 64, wherein said event log means includes:

an event counter, responsive to the receiving and processing means control signals representative of the position of said receiving and control means, for counting each time said receiving and control means is determined to have entered into restricted areas;

time accumulation means, responsive to the receiving and processing means control signals representative of the position of said receiving and control means, for determining at least the cumulative amount of time that said receiving and processing means is determined to be located in restricted areas; and an event display means for displaying the cumulative amount of time in the restricted areas of the course.

66. The golf cart control and monitoring system of claim 63, wherein said receiving and processing means outputs a third control signal when said receiving and processing means is determined to be located in a designated start area of the golf course and outputs a fourth control signal when said receiving and processing means is determined to be located in a designated end area of the golf course; and in which said system includes a playtime clock, said playtime clock being started responsive to the third control signal and stopped responsive to said fourth control signal, and a playtime display means, responsive to output signals from said playtime clock, for displaying the time which has elapsed since said playtime clock was started responsive to said third control signal.

67. The golf cart control and monitoring system of claim 66, wherein said receiving and processing means outputs a fifth control signal when said receiving and processing means is determined to be located in a designated intermediate travel position of the golf course, in which said receiving and processing means includes a memory and wherein the time reflected on said playtime clock is stored in said memory responsive to each fifth control signal.

68. The golf cart control and monitoring system of claim 67, wherein the digital signal being received includes information to identify the start area, the end area and the intermediate travel position, wherein said receiving and processing means determines the identity of the area, and the identity of the area is stored along with the time reflected on said playtime clock in said memory.

69. The golf cart control and monitoring system of claim 57, wherein said transmission means includes:
  microprocessing means for determining when to transmit the digital signal from said transmission means and for determining the digital signal to be transmitted;
  at least one antenna proximate each prespecified feature;
  at least one signal generating means for generating the signal to be transmitted at a specified power output, where there is one signal generating means for each antenna; and
  wherein said microprocessing means determines when to transmit the digital signal from each antenna and the digital signal to be transmitted from each antenna.

70. The golf cart control and monitoring system of claim 69, wherein said transmission means includes a power supply and means, responsive to said microprocessing means for enabling the selective interconnection of said power supply to a one of said signal generating means when said microprocessing means determines that the digital signal is to be transmitted from the antenna associated with the one of said generating means.

71. The golf cart control and monitoring system of claim 69, wherein each of said antennas is disposed below grade.

72. The golf cart control and monitoring system of claim 57, in which said system further includes a display means, disposed on the golf cart, for displaying a pre-scripted message, where there is at least one pre-scripted message to be displayed that advises a golf cart operator of the cart's location with respect to the restricted area, wherein said display means further includes message determining means, responsive to said receiving and processing means control signals, for determining the prescripted message to display.

73. The golf cart control and monitoring system of claim 57, in which said system further includes a solar electrical power supply means for providing electrical power from ambient light to energize said signal transmission means, wherein said solar electrical power supply means further includes a solar power cell to generate electrical power from the ambient light incident upon said solar power cell.

74. The golf cart control and monitoring system of claim 57, wherein said transmission means includes a lightning protection device that protects said transmission means from the effects of lightning strikes.

75. A golf cart control and monitoring system, comprising:
  transmitting means for generating a plurality of digital signals, said transmitting means being disposed proximate each prespecified feature of a golf course;
  receiving and processing means, disposed on the golf cart, for receiving and processing the digital signals from said transmitting means to determine said receiving and processing means position with respect to the course prespecified feature and for providing a control signal that is representative of the position of said receiving and processing means; and
  display means, disposed on the golf cart and being responsive to the receiving and processing means control signals, for displaying a pre-scripted message, where there is at least one pre-scripted message to be displayed that advises a golf cart operator of the cart's location with respect to the course prespecified feature.

76. The golf cart control and monitoring system of claim 75, wherein said display means includes message determining means, responsive to said receiving and processing means control signals, for determining the pre-scripted message to display.

77. The golf cart control and monitoring apparatus of claim 76, wherein said receiving and processing means outputs a first control signal when it is determined that said receiving and processing means is approaching a restricted area and generates a second control signal when it is determined that said receiving and processing means is entering the restricted area.

78. The golf cart control and monitoring apparatus of claim 77, wherein said display means displays a first pre-scripted message responsive to said first control signal and displays a second pre-scripted message responsive to said second control signal.

79. The golf cart control and monitoring apparatus of claim 78, wherein said display means further includes means, responsive to said first and second control signals, for generating auditory alarms.

80. The golf cart control and monitoring apparatus of claim 77, wherein said display means includes a liquid crystal display, said liquid crystal display being responsive to said message determining means so the selected pre-scripted message is displayed.

81. The golf cart control and monitoring system of claim 77, in which said system further includes event log means, responsive to the receiving and processing means control signals representative of the position of said receiving and control means, for generating a historical log of how many times and how long said receiving and processing means is determined to be located within golf course restricted areas, and wherein said event log means begins to accumulate data upon receipt of the second control signal and terminates data accumulation when it is determined that said receiving and processing means has exited the restricted area.

82. The golf cart control and monitoring system of claim 81, wherein said event log means includes:
  an event counter, responsive to the receiving and processing means control signals representative of the position of said receiving and control means, for counting each time said receiving and control means is determined to have entered into restricted areas;

time accumulation means, responsive to the receiving and processing means control signals representative of the position of said receiving and control means, for determining at least the cumulative amount of time that said receiving and processing means is determined to be located in restricted areas; and an event display means for displaying the cumulative amount of time in the restricted areas of the course.

83. The golf cart control and monitoring system of claim 77, wherein said receiving and processing means outputs a third control signal when said receiving and processing means is determined to be located in a designated start area of the golf course and outputs a fourth control signal when said receiving and processing means is determined to be located in a designated end area of the golf course; and in which said system includes a playtime clock, said playtime clock being started responsive to the third control signal and stopped responsive to said fourth control signal, and a playtime display means, responsive to output signals from said playtime clock, for displaying the time which has elapsed since said playtime clock was started responsive to said third control signal.

84. The golf cart control and monitoring system of claim 83, wherein said receiving and processing means outputs a fifth control signal when said receiving and processing means is determined to be located in a designated intermediate travel position of the golf course, in which said receiving and processing means includes a memory and wherein the time reflected on said playtime clock is stored in said memory responsive to each fifth control signal.

85. The golf cart control and monitoring system of claim 84, wherein the digital signal being received includes information to identify the start area, the end area and the intermediate travel position, wherein said receiving and processing means determines the identity of the area, and the identity of the area is stored along with the time reflected on said playtime clock in said memory.

86. The golf cart control and monitoring system of claim 77, wherein each of said antennas is disposed below grade.

87. The golf cart control and monitoring system of claim 75, wherein said transmission means includes:

microprocessing means for determining when to transmit the digital signal from said transmission means and for determining the digital signal to be transmitted;

at least one antenna proximate each prespecified feature;

at least one signal generating means for generating the signal to be transmitted at a specified power output, where there is one signal generating means for each antenna; and wherein said microprocessing means determines when to transmit the digital signal from each antenna and the digital signal to be transmitted from each antenna.

88. The golf cart control and monitoring system of claim 87, wherein said transmission means includes a power supply and means, responsive to said microprocessing means for enabling the selective interconnection of said power supply to a one of said signal generating means when said microprocessing means determines that the digital signal is to be transmitted from the antenna associated with the one of said generating means.

89. The golf cart control and monitoring system of claim 75, in which said system further includes an external visual warning means, disposed on the golf cart, for generating a visual signal, visible to golf course representatives at other locations on the golf course, to indicate the position of the golf cart with respect to the prespecified features on the golf course, said external visual warning means being responsive to said receiving and processing means control signals, wherein said external visual warning means is activated when said receiving and processing means is determined to be located within the restricted area.

90. The golf cart control and monitoring system of claim 75, in which said system further includes a solar electrical power supply means for providing electrical power from ambient light to energize said signal transmission means, wherein said solar electrical power supply means further includes a solar power cell to generate electrical power from the ambient light incident upon said solar power cell.

91. The golf cart control and monitoring system of claim 75, wherein said transmission means includes a lightning protection device that protects said transmission means from the effects of lightning strikes.

92. A golfing control and monitoring apparatus, comprising:

hole determining means for receiving digital signals being transmitted proximate at least one prespecified feature of a golf course and for determining, based on the received digital signals, a hole being played;

time interval means for storing a plurality of predetermined time intervals, each predetermined time interval being representative of the time of play for each hole on a golf course and for selecting the predetermined time interval for the hole being played; and an elapsed timer, responsive to said hole determining and time interval means, said elapsed timer outputting signals representative of time that has elapsed for the hole being played.

93. The golfing control and monitoring apparatus of claim 92, further comprising a memory storage means for storing information and data, wherein time taken to play a given hole and an identifier for the given hole is stored in said memory storage means.

94. The golfing control and monitoring apparatus of claim 93, further comprising means for retrieving at least the time interval and hole identifier data stored in said memory storage means and for displaying retrieved information to course representatives.

95. The golfing control and monitoring apparatus of claim 92, further comprising a display means, responsive to said elapsed timer means and said time interval means, for displaying time of play for each hole.

96. The golfing control and monitoring apparatus of claim 95, wherein said display means includes a count-down clock display, wherein said count-down display initially displays the selected predetermined time interval, and wherein the time of play being displayed is decremented responsive to clocking signals from said elapsed timer.

97. The golfing control and monitoring apparatus of claim 96, further comprises time means for determining when time that has elapsed for the hole being played exceeds the selected predetermined time interval.

98. The golfing control and monitoring apparatus of claim 97, wherein said display means further includes a message display for displaying a pre-scripted message when said time means determines that the selected predetermined time interval is exceeded.

99. The golfing control and monitoring apparatus of claim 97, further comprising a time alarm, said time alarm providing an alarm signal to a golfer when said time means determines that the selected predetermined time interval is exceeded.

100. The golfing control and monitoring apparatus of claim 93, wherein said display means includes a count-up clock to display time of play for each hole and wherein the time of play being displayed for a given hole is incremented responsive to clocking signals from said elapsed timer.

101. The golfing control and monitoring apparatus of claim 100, further comprises time means for determining when time that has elapsed for the hole being played exceeds the selected predetermined time interval.

102. The golfing control and monitoring apparatus of claim 101, wherein said display means further includes a message display for displaying a pre-scripted message when said time means determines that the selected predetermined time interval is exceeded.

103. The golfing control and monitoring apparatus of claim 101, further comprising a time alarm, said time alarm providing an alarm signal to a golfer when said time means determines that the selected predetermined time interval is exceeded.

104. The golfing control and monitoring apparatus of claim 92, further comprising:

time warning means for determining when the time that has elapsed for the hole being played meets any of at least one specified warning time interval; and warning alarm means, responsive to said time warning means, for generating a warning signal to a golfer to indicate that one of the said at least one specified warning time intervals has been met.

105. The golfing control and monitoring apparatus of claim 104, wherein said warning alarm means includes an alarm that generates an auditory signal.

106. The golfing control and monitoring apparatus of claim 100, where one group of digital signals being transmitted is representative of a starting point for play, where a second group of digital signals being transmitted is representative of an ending point for play, and where a third group of digital signals being transmitted is representative of an intermediate play position and wherein said hole determining means includes signal receiving processing and display means for receiving and processing the digital signals being transmitted proximate at least one prespecified course feature and for providing output signals representative of the location of said hole determining means, where said signal receiving processing and display means provides a start signal when the first digital signal group is received, provides a stop signal when the second digital signal group is received, and provides an intermediate play position when the third digital signal group is received.

107. The golfing control and monitoring apparatus of claim 106, wherein said time interval means selects the predetermined time interval for each hole to be played responsive to said start, stop, and intermediate play control signals.

108. The golfing control and monitoring apparatus of claim 107, wherein the digital signal for each of the first, second and third group of digital signals is transmitted at a different frequency and wherein said signal receiving processing and display means includes a plurality of receivers, one for each frequency being used for the transmission of each group of digital signals.

109. The golfing control and monitoring apparatus of claim 107, wherein the digital signal for each of the first, second and third group of digital signals is transmitted at the same frequency and wherein said signal receiving processing and display means includes a receiver configured for the frequency being used for transmission of digital signals.

110. The golfing control and monitoring apparatus of claim 106, wherein each designated starting point area, each designated ending point area, and each designated intermediate play position are located so that each hole of the golf course is defined by a unique starting and ending point.

111. The golfing control and monitoring apparatus of claim 106, where digital signals are being transmitted proximate at least one restricted area of a golf course; wherein said signal receiving processing and display means further includes receiving and processing the digital signals being transmitted from each of said at least one restricted area and for providing output signals representative of said signal receiving processing and display means position with respect to the restricted area, where at least one of said signal receiving and processing means output signals is representative of said signal receiving processing and display means being located in the at least one restricted area; and in which said golfing control and monitoring apparatus further includes event log means, responsive to the signal receiving and processing means output signals, for generating a historical log of how long and how many times the golf cart was located within restricted areas of the golf course.

112. The golfing control and monitoring apparatus of claim 111, wherein said event log means includes:

means, responsive to the signal receiving and processing means output signals, for counting each time the golf cart has entered into restricted areas of the golf course and for providing a visual display to a golf cart operator of the total number of restricted area entries; and time means, responsive to the signal receiving and processing means output signals, for determining the cumulative amount of time the golf cart has been located in restricted areas and for providing a visual display to the golf cart operator of the cumulative time.

113. The golfing control and monitoring apparatus of claim 111, wherein said signal receiving processing and display means further includes a display means for displaying at least one prescripted message to advise of said signal receiving processing and display means location with respect to the restricted area, wherein said display means further includes message determining means, responsive to the signal receiving and processing means output signals, for determining which pre-scripted message to display.

* * * * *

UNITED STATES PATENT AND TRADEMARK OFFICE
CERTIFICATE OF CORRECTION

PATENT NO. : 5,719,555
DATED : February 17, 1998
INVENTOR(S) : Zeytoonjian et al.

It is certified that error appears in the above-indentified patent and that said Letters Patent is hereby corrected as shown below:

Column 14, Line 50: Delete "114" and insert -- 14 -- therefor;

Column 16, Line 4: Delete "208a" and insert -- 202a -- therefor;

Column 16, Line 26: Delete "208a" and insert -- 202a therefor;

Column 16, Line 30: Delete "208a" and insert -- 202a therefor;

Column 18, Line 64: Delete "114" and insert -- 14 -- therefor;

Column 26, Line 52: Delete "114" and insert -- 14 -- therefor;

Column 27, Line 23: Delete "114" and insert -- 14 -- therefor;

Column 34, Line 8: Delete "114" and insert -- 14 -- therefor;

UNITED STATES PATENT AND TRADEMARK OFFICE
CERTIFICATE OF CORRECTION

PATENT NO. : 5,719,555
DATED : February 17, 1998
INVENTOR(S) : Zeytoonjian et al.

It is certified that error appears in the above-indentified patent and that said Letters Patent is hereby corrected as shown below:

Column 38, Line 8: Delete "of" (first occurrence);

Column 39, Line 24: Delete "output signals";

Column 41, Line 41: Delete "claim" and insert -- claim 40 -- therefor;

Column 41, line 50: Delete "claim" and insert -- claim 40 -- therefor;

Column 41, line 57: Delete "claim" and insert -- claim 40 -- therefor.

Signed and Sealed this

Twenty-eighth Day of July, 1998

Attest:

BRUCE LEHMAN

*Attesting Officer*     *Commissioner of Patents and Trademarks*